United States Patent
Polychronakis et al.

(10) Patent No.: US 11,990,745 B2
(45) Date of Patent: May 21, 2024

(54) METHODS AND SYSTEMS FOR REMOTE MONITORING OF SURGE PROTECTIVE DEVICES

(71) Applicant: RAYCAP IP DEVELOPMENT LTD, Nicosia (CY)

(72) Inventors: Orestis Polychronakis, Athens (GR); Matic Jezeršek, Škofja Loka (SI); Ivan Žilič, Ljubljana (SI); Sebastjan Kamenšek, Škofja Loka (SI)

(73) Assignee: RAYCAP IP DEVELOPMENT LTD, Nicosia (CY)

( * ) Notice: Subject to any disclaimer, the term of this patent is extended or adjusted under 35 U.S.C. 154(b) by 34 days.

(21) Appl. No.: 17/573,743

(22) Filed: Jan. 12, 2022

(65) Prior Publication Data
US 2023/0223749 A1    Jul. 13, 2023

(51) Int. Cl.
*H02H 9/04* (2006.01)
*H02H 1/00* (2006.01)
*H02H 9/06* (2006.01)

(52) U.S. Cl.
CPC .......... *H02H 9/041* (2013.01); *H02H 1/0046* (2013.01); *H02H 9/06* (2013.01)

(58) Field of Classification Search
CPC ............ H02H 9/041; H02H 9/42; H02H 9/06; H02H 1/0046; H02H 3/048; G01R 31/1236
See application file for complete search history.

(56) References Cited

U.S. PATENT DOCUMENTS

| | | |
|---|---|---|
| 1,144,029 A | 6/1915 | Elmer |
| 2,158,859 A | 5/1939 | Horikoshi |
| 2,311,758 A | 2/1943 | Johansson |
| 2,805,294 A | 9/1957 | H |
| 2,971,132 A | 2/1961 | Nash |
| 3,249,719 A | 5/1966 | Misare et al. |
| 3,375,405 A | 3/1968 | Chiffee et al. |
| 3,522,570 A | 8/1970 | Oley |
| 3,711,794 A | 1/1973 | Tasca et al. |
| 3,743,996 A | 7/1973 | Harnden |
| 3,813,577 A | 5/1974 | Kawiecke |
| 4,015,228 A | 3/1977 | Eda et al. |
| 4,023,133 A | 5/1977 | Knapp |

(Continued)

FOREIGN PATENT DOCUMENTS

| | | |
|---|---|---|
| CH | 466427 A | 12/1968 |
| CN | 106026067 A | 10/2016 |

(Continued)

OTHER PUBLICATIONS

Beitz et al. "Dubbel Taschenbuch für den Maschinenbau" (3 pages) (1997).

(Continued)

*Primary Examiner* — Scott Bauer
(74) *Attorney, Agent, or Firm* — Myers Bigel, P.A.

(57) ABSTRACT

A surge protective device includes an overvoltage protection circuit and a control module coupled to the overvoltage protection circuit that is configured to monitor at least one performance characteristic of the overvoltage protection circuit and is further configured to communicate the at least one performance characteristic to a destination external to the surge protective device.

26 Claims, 20 Drawing Sheets

(56) References Cited

U.S. PATENT DOCUMENTS

| | | |
|---|---|---|
| 4,085,397 A | 4/1978 | Charles |
| 4,092,694 A | 5/1978 | Stetson |
| 4,217,618 A | 8/1980 | Kellenbenz et al. |
| 4,240,124 A | 12/1980 | Westrom |
| 4,241,374 A | 12/1980 | Gilberts |
| 4,249,224 A | 2/1981 | Baumbach |
| 4,288,833 A | 9/1981 | Howell |
| 4,355,345 A | 10/1982 | Franchet |
| 4,425,017 A | 1/1984 | Chan |
| 4,493,003 A | 1/1985 | Mickelson et al. |
| 4,571,656 A | 2/1986 | Ruckman |
| 4,595,635 A | 6/1986 | Dubrow et al. |
| 4,600,261 A | 7/1986 | Debbaut |
| 4,638,284 A | 1/1987 | Levinson |
| 4,701,574 A | 10/1987 | Shimirak et al. |
| 4,906,963 A | 3/1990 | Ackermann et al. |
| 4,908,730 A | 3/1990 | Westrom |
| 4,956,696 A | 9/1990 | Hoppe et al. |
| 5,006,950 A | 4/1991 | Allina |
| 5,130,884 A | 7/1992 | Allina |
| 5,172,296 A | 12/1992 | Kaczmarek |
| 5,311,164 A | 5/1994 | Keda et al. |
| 5,519,564 A | 5/1996 | Carpenter |
| 5,523,916 A | 6/1996 | Kaczmarek |
| 5,529,508 A | 6/1996 | Chiotis et al. |
| 5,588,856 A | 12/1996 | Collins et al. |
| 5,621,599 A | 4/1997 | Larsen et al. |
| 5,652,690 A | 7/1997 | Mansfield et al. |
| 5,721,664 A | 2/1998 | Uken et al. |
| 5,724,221 A | 3/1998 | Law |
| 5,781,394 A | 7/1998 | Lorenz et al. |
| 5,808,850 A | 9/1998 | Carpenter |
| 5,936,824 A | 8/1999 | Carpenter |
| 5,990,778 A | 11/1999 | Struempler et al. |
| 6,038,119 A | 3/2000 | Atkins et al. |
| 6,094,128 A | 7/2000 | Bennett et al. |
| 6,172,865 B1 | 1/2001 | Boy et al. |
| 6,175,480 B1 | 1/2001 | Karmazyn |
| 6,222,433 B1 | 4/2001 | Ramakrishnan et al. |
| 6,226,166 B1 | 5/2001 | Gumley et al. |
| 6,430,019 B1 | 8/2002 | Martenson et al. |
| 6,430,020 B1 | 8/2002 | Atkins et al. |
| 6,459,559 B1 | 10/2002 | Christofersen |
| 6,556,402 B2 | 4/2003 | Kizis et al. |
| 6,614,640 B2 | 9/2003 | Richter et al. |
| 6,930,871 B2 | 8/2005 | Macanda |
| 7,433,169 B2 | 10/2008 | Kamel et al. |
| 7,558,041 B2 | 7/2009 | Lagnoux |
| 7,684,166 B2 | 3/2010 | Donati et al. |
| 7,738,231 B2 | 6/2010 | Lagnoux |
| 8,493,170 B2 | 7/2013 | Zaeuner et al. |
| 8,659,866 B2 | 2/2014 | Douglass et al. |
| 8,699,197 B2 | 4/2014 | Douglass et al. |
| 8,743,525 B2 | 6/2014 | Xepapas et al. |
| 9,170,279 B2 | 10/2015 | Bent et al. |
| 9,349,548 B2 | 5/2016 | Juricev |
| 9,355,763 B2 | 5/2016 | Xu |
| 9,570,260 B2 | 2/2017 | Yang et al. |
| 9,634,554 B2 | 4/2017 | Falk et al. |
| 9,906,017 B2 | 2/2018 | Tsovilis et al. |
| 10,319,545 B2 | 6/2019 | Kamensek et al. |
| 10,340,110 B2 | 7/2019 | Vrhunc et al. |
| 10,420,232 B2 | 9/2019 | Kamen{Hacek et al. |
| 10,468,874 B2 | 11/2019 | Pons Gonzalez et al. |
| 10,679,814 B2 | 6/2020 | Vrhunc et al. |
| 10,685,767 B2 | 6/2020 | Kamensek et al. |
| 2002/0018331 A1 | 2/2002 | Takahashi |
| 2002/0024792 A1 | 2/2002 | Cantagrel |
| 2003/0184926 A1 | 10/2003 | Wu et al. |
| 2004/0150937 A1 | 8/2004 | Bobert et al. |
| 2005/0185356 A1 | 8/2005 | Durth |
| 2005/0231872 A1 | 10/2005 | Schimanski et al. |
| 2006/0245125 A1 | 11/2006 | Aszmus |
| 2006/0291127 A1 | 12/2006 | Kim et al. |
| 2007/0139850 A1 | 6/2007 | Kamel et al. |
| 2007/0217106 A1 | 9/2007 | Agnoux |
| 2008/0043395 A1 | 2/2008 | Donati et al. |
| 2008/0049370 A1 | 2/2008 | Adachi et al. |
| 2009/0302992 A1 | 12/2009 | Cernicka |
| 2011/0013330 A1 | 1/2011 | Crevenat et al. |
| 2011/0193674 A1 | 8/2011 | Zaeuner et al. |
| 2011/0248816 A1 | 10/2011 | Duval et al. |
| 2012/0050935 A1 | 3/2012 | Douglass et al. |
| 2012/0086539 A1 | 4/2012 | Duval et al. |
| 2012/0086540 A1 | 4/2012 | Duval et al. |
| 2012/0206848 A1 | 8/2012 | Gillespie et al. |
| 2012/0250205 A1 | 10/2012 | Pfitzer et al. |
| 2012/0268850 A1 | 10/2012 | Rainer et al. |
| 2013/0033787 A1* | 2/2013 | Werner .................. H02H 3/04 361/21 |
| 2013/0038976 A1 | 2/2013 | Hagerty |
| 2013/0200986 A1 | 8/2013 | Koprivsek |
| 2013/0265685 A1 | 10/2013 | Zäuner et al. |
| 2013/0335869 A1 | 12/2013 | Xepapas et al. |
| 2014/0010704 A1 | 1/2014 | Ishida et al. |
| 2014/0092514 A1 | 4/2014 | Chen |
| 2014/0292472 A1 | 10/2014 | Qin et al. |
| 2014/0327990 A1 | 11/2014 | Juricev |
| 2015/0103462 A1 | 4/2015 | Depping |
| 2015/0107972 A1 | 4/2015 | Oh |
| 2015/0222112 A1* | 8/2015 | Wallace ............... H02H 1/0061 361/90 |
| 2015/0270086 A1 | 9/2015 | Tsan-Chi |
| 2015/0280420 A1 | 10/2015 | Mao |
| 2015/0349523 A1 | 12/2015 | Tsovilis et al. |
| 2016/0087520 A1 | 3/2016 | Falk et al. |
| 2016/0161547 A1* | 6/2016 | Farquhar, III ......... G01K 13/00 324/549 |
| 2016/0172848 A1* | 6/2016 | Skinner .................. H01T 4/02 361/91.1 |
| 2016/0276821 A1 | 9/2016 | Politis et al. |
| 2017/0117700 A1* | 4/2017 | Idota .................... H01R 13/10 |
| 2017/0311462 A1 | 10/2017 | Kamensek et al. |
| 2017/0330718 A1* | 11/2017 | Funcheon ............. H01H 83/10 |
| 2018/0138698 A1 | 5/2018 | Tsovilis et al. |
| 2018/0151318 A1 | 5/2018 | Kamensek et al. |
| 2018/0183230 A1 | 6/2018 | Kostakis et al. |
| 2018/0183232 A1 | 6/2018 | Tavcar et al. |
| 2018/0330908 A1 | 11/2018 | Vrhunc et al. |
| 2018/0358804 A1* | 12/2018 | Pelegris ............. H01R 13/6691 |
| 2019/0080826 A1 | 3/2019 | Kamensek et al. |
| 2020/0036187 A1 | 1/2020 | Tsovilis et al. |
| 2021/0006064 A1 | 1/2021 | Janik et al. |
| 2022/0159808 A1* | 5/2022 | Bedo ..................... H05B 47/19 |
| 2022/0357387 A1* | 11/2022 | Saenger ............. G01K 11/3213 |
| 2023/0124733 A1* | 4/2023 | Martinjak ............. H02H 9/042 324/764.01 |

FOREIGN PATENT DOCUMENTS

| | | |
|---|---|---|
| DE | 1018953 B | 11/1957 |
| DE | 3111096 A1 | 9/1982 |
| DE | 3428258 A1 | 2/1986 |
| DE | 4235329 A1 | 4/1994 |
| DE | 69201021 T2 | 2/1995 |
| DE | 4438593 A1 | 5/1996 |
| DE | 19823446 A1 | 11/1999 |
| DE | 19839422 A1 | 3/2000 |
| DE | 19843519 A1 | 4/2000 |
| DE | 202004006227 U1 | 9/2004 |
| DE | 10323220 A1 | 12/2004 |
| DE | 102005048003 A1 | 4/2007 |
| DE | 102006003274 A1 | 7/2007 |
| DE | 202008004699 U1 | 6/2008 |
| DE | 102007014336 A1 | 10/2008 |
| DE | 102008017423 A1 | 10/2009 |
| DE | 102008026555 A1 | 12/2009 |
| DE | 102012004678 A1 | 9/2013 |
| DE | 202006021210 U1 | 9/2013 |
| DE | 102013103753 A1 | 10/2013 |
| DE | 102013011216 B3 | 10/2014 |
| DE | 102013107807 B3 | 1/2015 |
| DE | 102013021936 B3 | 2/2015 |

(56) References Cited

FOREIGN PATENT DOCUMENTS

| | | |
|---|---|---|
| DE | 102014016938 B3 | 2/2016 |
| DE | 102014016830 A1 | 3/2016 |
| DE | 102007030653 B4 | 4/2017 |
| EP | 0108518 A2 | 5/1984 |
| EP | 60-187002 A | 9/1985 |
| EP | 0203737 A2 | 12/1986 |
| EP | 0335479 A2 | 10/1989 |
| EP | 0445054 A1 | 9/1991 |
| EP | 0462694 A2 | 12/1991 |
| EP | 0516416 A1 | 12/1992 |
| EP | 0603428 A1 | 6/1994 |
| EP | 0785625 A2 | 7/1997 |
| EP | 0963590 A1 | 12/1999 |
| EP | 1094550 A2 | 4/2001 |
| EP | 1102371 A1 | 5/2001 |
| EP | 1116246 A1 | 7/2001 |
| EP | 1148530 A1 | 10/2001 |
| EP | 1355327 A2 | 10/2003 |
| EP | 1458072 A1 | 9/2004 |
| EP | 1482317 B1 | 6/2006 |
| EP | 1798742 A1 | 6/2007 |
| EP | 2075811 A2 | 7/2009 |
| EP | 2201654 A1 | 6/2010 |
| EP | 2707892 A1 | 3/2014 |
| EP | 2725588 A1 | 4/2014 |
| EP | 2953142 A1 | 12/2015 |
| EP | 2954538 A1 | 12/2015 |
| EP | 3001525 A1 | 3/2016 |
| EP | 2954538 B1 | 9/2016 |
| EP | 3240132 A1 | 11/2017 |
| EP | 3460938 A1 | 3/2019 |
| EP | 3503331 A1 | 6/2019 |
| FR | 2574589 A1 | 6/1986 |
| FR | 2622047 A1 | 4/1989 |
| FR | 2897231 A1 | 8/2007 |
| JP | 60226103 A | 11/1985 |
| JP | 60258905 A | 12/1985 |
| JP | 61-198701 A | 9/1986 |
| JP | 1176687 A | 7/1989 |
| JP | H05176445 A | 7/1993 |
| JP | 09-326546 | 12/1997 |
| JP | 2002525861 A | 8/2002 |
| JP | 2002525862 A | 8/2002 |
| SI | 9700277 A | 4/1999 |
| SI | 9700332 A | 6/1999 |
| SI | 20781 A | 6/2002 |
| SI | 20782 A | 6/2002 |
| SI | 22030 A | 10/2006 |
| SI | 23303 A | 8/2011 |
| SI | 23749 A | 11/2012 |
| SI | 24371 A | 11/2014 |
| WO | 8800603 A2 | 1/1988 |
| WO | 9005401 A1 | 5/1990 |
| WO | 9515601 A1 | 6/1995 |
| WO | 9524756 A1 | 9/1995 |
| WO | 9742693 A1 | 11/1997 |
| WO | 9838653 A1 | 9/1998 |
| WO | 0017892 A1 | 3/2000 |
| WO | 2007117163 A1 | 10/2007 |
| WO | 2008009507 A1 | 1/2008 |
| WO | 2008104824 A1 | 9/2008 |
| WO | 2009082484 A1 | 7/2009 |
| WO | 2011102811 A2 | 8/2011 |
| WO | 2012026888 A1 | 3/2012 |
| WO | 2012154134 A1 | 11/2012 |
| WO | 2013044961 A1 | 4/2013 |
| WO | 2016101776 A1 | 6/2016 |
| WO | 2016110360 A1 | 7/2016 |

OTHER PUBLICATIONS

Data Book Library 1997 Passive Components, Siemens Matsushita Components pp. 15-17, 26-32, 36-37, 39, 161, 166, 167, 169, 171-174 (1997).

FormexTM GK/Formex Product Data Flame Retardant Polypropylene Sheet, ITW Formex (4 pages) (2002).

Oberg et al. "Machinery's Handbook 27th Edition—Soldering and Brazing" (4 pages) (2004).

Raycap "RayvossTM Transient Voltage Surge Suppression System" webpage, http://www.raycap.com/surge/rayvoss.htm accessed on Nov. 29, 2005 (1 page) (Date Unknown; Admitted Prior Art).

Raycap "Revolutionary Lightning Protection Technology" Raycap Corporation Press Release, webpage, http://www.raycap.com/news/020930.htm accessed on Nov. 29, 2005 (1 page) (Date Unknown; Admitted Prior Art).

Raycap "The Ultimate Overvoltage Protection: RayvossTM" brochure (4 pages) (Date Unknown; Admitted Prior Art).

Raycap "Strikesorb® 30 Series OEM Surge Suppression Solutions" brochure (2 pages) (Apr. 17, 2009).

Raycap "The Next Generation Surge Protection Rayvoss™" brochure (4 pages) (May 4, 2012).

Raycap "The Ultimate Overvoltage Protection Rayvoss™" brochure (4 pages) (2005).

Raycap "The Ultimate Overvoltage Protection Rayvoss™" brochure (4 pages) (Jan. 2009).

RayvossTM "The Ultimate Overvoltage Protection" webpage, http://www.rayvoss.com accessed on Nov. 29, 2005 (2 pages) (Date Unknown; Admitted Prior Art).

RayvossTM "Applications" webpage http://www.rayvoss.com/applications.htm accessed on Nov. 29, 2005 (4 pages) (undated).

RayvossTM "Frequently Asked Questions" webpage, http://www.rayvoss.com/faq.htm accessed on Nov. 29, 2005 (2 pages) (Date Unknown; Admitted Prior Art).

RayvossTM "Technical Information" webpage, http://www.rayvoss.com/tech_info.htm accessed on Nov. 29, 2005 (3 pages) (Date Unknown; Admitted Prior Art).

Translation of DIN-Standards, Built-In Equipment for Electrical Installations; Overall Dimensions and Related Mounting Dimensions (15 pages) (Dec. 1988).

VAL-MS-T1/T2 335/12.5/3+1, Extract from the online catalog, Phoenix Contact GmbH & Co. KG, http://catalog.phoenixcontact.net/phoenix/treeViewClick.do?UID=2800184 (7 pages) (May 22, 2014).

ProSEC II+ Installation Instructions, Raycap (1 page) (2019).

ProSLS User Manual, Raycap (12 pages) (Date Unknown but Admitted Prior Art).

ProTec T1 3+1 Lightning and Overvoltage Protection 12.5 kA Series Data Sheet, Raycap (Oct. 2020).

WI-I/O-2-E-N-GBL 802.11 Wireless I/O and Gateway User Manual, Weidmüller (63 pages) (Feb. 2018).

DuPont 4300 Series Resistors Technical Data Sheet (3 pages) (May 2013).

Extended European Search Report corresponding to EP 23151223.7; Dated Jun. 9, 2023 (10 pages).

Wetter, et al., "Smart IoT Monitoring System for Surge Protective Devices (SPDs)", 11th Asia-Pacific International Conference on Lightning (APL), Jun. 12-14, 2019. Hong Kong, China, 1-5.

* cited by examiner

METHODS AND SYSTEMS FOR REMOTE MONITORING OF SURGE PROTECTIVE DEVICES

FIELD OF THE INVENTION

The present invention relates to surge protective devices and, more particularly, to monitoring the status and/or performance of surge protective devices.

BACKGROUND OF THE INVENTION

Frequently, excessive voltage or current is applied across service lines that deliver power to residences and commercial and institutional facilities. Such excess voltage or current spikes (transient overvoltages and surge currents) may result from lightning strikes, for example. The above events may be of particular concern in telecommunications distribution centers, hospitals and other facilities where equipment damage caused by overvoltages and/or current surges is not acceptable and resulting down time may be very costly.

Typically, sensitive electronic equipment may be protected against transient overvoltages and surge currents using surge protective devices (SPDs). For example, an overvoltage protection device may be installed at a power input of equipment to be protected, which is typically protected against overcurrents when it fails. Typical failure mode of an SPD is a short circuit. The overcurrent protection typically employed is a combination of an internal thermal disconnector to protect the device from overheating due to increased leakage currents and an external fuse to protect the device from higher fault currents. Different SPD technologies may avoid the use of the internal thermal disconnector because, in the event of failure, they change their operation mode to a low ohmic resistance.

In the event of a surge current in a line L (e.g., a voltage line of a three phase electrical power circuit), protection of power system load devices may necessitate providing a current path to ground for the excess current of the surge current. The surge current may generate a transient overvoltage between the line L and the neutral line N (the neutral line N may be conductively coupled to a protective earth ground PE). Because the transient overvoltage significantly exceeds the operating voltage of the SPD, the SPD may become conductive, allowing the excess current to flow from line L through the SPD to the neutral line N. Once the surge current has been conducted to the neutral line N, the overvoltage condition ends and the SPD may become non-conducting again.

SPDs are typically connected in parallel in an installation and overvoltage/surge current events may not always be noticed by personnel responsible for managing a facility. In addition, an SPD is generally not self-aware and does not provide a direct or automated way to communicate its status or operational state. Thus, when multiple SPDs are distributed in multiple locations throughout an installation, which may have different protection requirements, they may not include an automated capability of communicating information concerning their status to other SPDs and/or to the personnel responsible for managing the facility. To evaluate the status of an SPD, maintenance personnel typically use an external device to test one or more components of the SPD using physical wires or connectors. In some examples, multiple such external devices may be used to evaluate different components of the SPD. It may, therefore, be difficult for management personnel of a facility to obtain an overview of the status of various SPDs deployed throughout a facility to assess the overall level of risk as well as the risks to particular areas throughout the facility.

SUMMARY

According to some embodiments of the inventive concept, a surge protective device (SPD) comprises an overvoltage protection circuit and a control module coupled to the overvoltage protection circuit that is configured to monitor at least one performance characteristic of the overvoltage protection circuit and is further configured to communicate the at least one performance characteristic to a destination external to the surge protective device.

In other embodiments of the inventive concept, the control module is further configured to communicate the at least one performance characteristic to the destination using a wireless communication protocol.

In still other embodiments of the inventive concept, the wireless communication protocol comprises a cellular communication protocol, a Wi-Fi communication protocol, a Bluetooth communication protocol, and/or a Near Field Communication (NFC) communication protocol.

In still other embodiments, the control module is further configured to communicate the at least one performance characteristic to the destination over a wired connection.

In still other embodiments, the at least one performance characteristic of the overvoltage protection circuit comprises information corresponding to a transient overvoltage event.

In still other embodiments, the information corresponding to a transient overvoltage event comprises information corresponding to a plurality of transient overvoltage events.

In still other embodiments, the information corresponding to the plurality of transient overvoltage events comprises a plurality of timestamps corresponding to the plurality of transient overvoltage events, respectively, and a count of a number of the plurality of overvoltage events.

In still other embodiments, the overvoltage protection circuit comprises a varistor and a gas discharge tube connected to the at least one varistor.

In still other embodiments, the at least one performance characteristic of the overvoltage protection circuit comprises a leakage current of the varistor.

In still other embodiments, the control module is further configured to generate a replacement alarm for the varistor based on the leakage current.

In still other embodiments, the overvoltage protection circuit comprises a plurality of varistors and the at least one performance characteristic of the overvoltage protection circuit comprises a plurality of leakage currents corresponding to the plurality of varistors, respectively.

In still other embodiments, the at least one performance characteristic of the overvoltage protection circuit comprises information corresponding to a surge current event through the gas discharge tube.

In still other embodiments, the information corresponding to the surge current event comprises information corresponding to a plurality of surge current events.

In still other embodiments, the information corresponding to the plurality of surge current events comprises a plurality of timestamps corresponding to the plurality of surge current events, respectively and a count of a number of the plurality of surge current events.

In still other embodiments, the control module is further configured to generate a failure alarm responsive to detecting a failure of the varistor or the gas discharge tube.

In still other embodiments, the at least one performance characteristic of the overvoltage protection circuit comprises an impedance of a galvanic loop formed between one power line of a three-phase power line configuration originating at an electrical power transformer site and a neutral line, the galvanic loop including the control module therein.

In still other embodiments, the at least one performance characteristic of the overvoltage protection circuit comprises an impedance of a galvanic loop formed between one power line of a three-phase power line configuration originating at an electrical power transformer site and a protective earth terminal, the galvanic loop including the control module therein.

In still other embodiments, the SPD further comprises a housing. The overvoltage protection circuit and the control module are coupled to the housing.

In still other embodiments, the SPD is a first SPD and the destination is a second SPD. The control module is further configured to communicate an operational status of the SPD to the second SPD.

In some embodiments of the inventive concept, an SPD management system, comprises a processor and a memory coupled to the processor and comprising computer readable program code embodied in the memory that is executable by the processor to perform operations comprising: establishing a communication connection with an SPD, the SPD comprising an overvoltage protection circuit and a control module and receiving information corresponding to at least one performance characteristic for the overvoltage protection circuit from the control module.

In further embodiments, the operations further comprise associating a geolocation with the SPD.

In still further embodiments, receiving the information comprises receiving the information corresponding to the at least one performance characteristic for the overvoltage protection circuit from the control module using a wireless communication protocol.

In still further embodiments, the wireless communication protocol comprises a cellular communication protocol, a Wi-Fi communication protocol, a Bluetooth communication protocol, and/or a Near Field Communication (NFC) communication protocol.

In still further embodiments, receiving the information comprises receiving the information corresponding to the at least one performance characteristic for the overvoltage protection circuit from the control module over a wired connection.

It is noted that aspects described with respect to one embodiment may be incorporated in different embodiments although not specifically described relative thereto. That is, all embodiments and/or features of any embodiments can be implemented separately or combined in any way and/or combination. Moreover, other apparatus, methods, systems, articles of manufacture, and/or computer program products according to embodiments of the inventive subject matter will be or become apparent to one with skill in the art upon review of the following drawings and detailed description. It is intended that all such additional apparatus, systems, methods, articles of manufacture, and/or computer program products be included within this description, be within the scope of the present inventive subject matter, and be protected by the accompanying claims.

BRIEF DESCRIPTION OF THE DRAWINGS

The accompanying drawings, which form a part of the specification, illustrate embodiments of the present invention.

DETAILED DESCRIPTION OF EMBODIMENTS OF THE INVENTION

Figure 1:
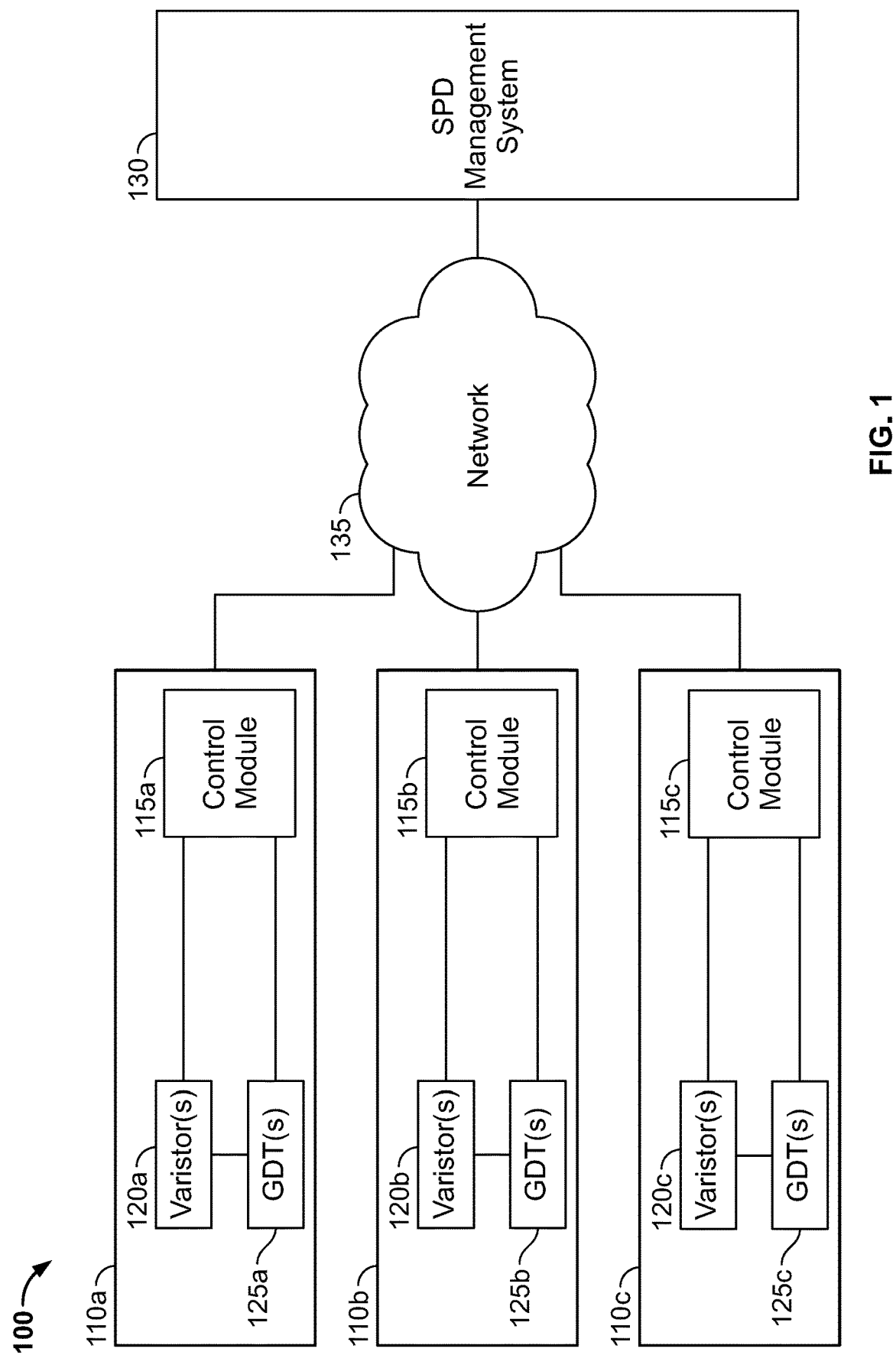
FIG. 1 is a block diagram that illustrates a communication network including multiple surge protective devices (SPDs) and an SPD management system in accordance with some embodiments of the inventive concept.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term a data processing system may include, but it is not limited to, a hardware element, firmware component, and/or software component.

As used herein, "monolithic" means an object that is a single, unitary piece formed or composed of a material without joints or seams. Alternatively, a unitary object can be a composition composed of multiple parts or components secured together at joints or seams.

Some embodiments of the inventive concept stem from a realization that typically surge protective devices (SPDs) provide only a lower level, local protection to installations where they are deployed. Power network stress events, however, such as overvoltages, current surges, and the like may affect broader areas of an installation. It has typically been difficult to obtain SPD status information, which can be used to evaluate the health of the SPD(s), predict a lifespan of an SPD, assess the vulnerability of an installation over a broader geographic area, and/or provide a basis for a statistical analysis of stress events. Some embodiments of the inventive concept may provide an SPD with a remote monitoring capability allowing the SPD to communicate one or more performance characteristics of the SPD to destinations external to the SPD. The SPD may communicate raw data and/or may process the data to provide assessments and/or predictions of the status of the SPD, the longevity of the SPD, and/or the number and types of stress events that have occurred. In accordance with various embodiments of the inventive concept, raw and/or pre-processed/analyzed information may be communicated from one or more SPDs to an SPD management system, which may be a local, networked, and/or cloud-based (e.g., Internet accessible) data processing system. The raw and/or pre-processed/analyzed information may be communicated using one or more wireless and/or wired communication protocols/media. The SPD management system may further analyze and process the SPD information to evaluate the status of the SPDs individually and/or as a group. The SPD management system may also assess the status and/or vulnerabilities of the installation in which the one or more SPDs are deployed. Through geolocation information associated with the SPDs, a real-time statistical electrical network stress mapping/assessment may be obtained. Through predictive analytics, maintenance routines and procedures may be scheduled to reduce the risk of SPD failure.

Referring to FIG. 1, a communication network 100, according to some embodiments of the inventive concept, comprises one or more SPDs 110a, 110b, and 110c that are coupled to an SPD management system 130 by way of a network 120. Each of the SPDs 110a, 110b, and 110c may include a control module 115a, 115b, and 115c, one or more varistors 120a, 120b, and 120c, and one or more gas discharge tubes (GDTs) 125a, 125b, and 125c, which are coupled to the control module 115a, 115b, and 115c. The varistor(s) 120a, 120b, and 120c along with the GDT(s) 125a, 125b, and 125c in each of the SPDs 110a, 110b, and 110c may be viewed together as an overvoltage protection circuit. The control module 115a, 115b, and 115c may be configured as a data processing system with signal conditioning/processing circuitry, a processor, memory, and one or more control programs that facilitate the reception and processing of information associated with one or more performance characteristics corresponding to the overvoltage protection circuit, i.e., the varistor(s) 120a, 120b, and 120c along with the GDT(s) 125a, 125b, and 125c. The control module 115a, 115b, and 115c may be further configured to communicate the one or more performance characteristics to a destination external to the SPD 110a, 110b, and 110c, such as the SPD management system 130 or another one of the SPDs 110a, 110b, and 110c. In particular, the control module 115a, 115b, and 115c may be further configured to communicate the one or more performance characteristics to a destination external to and remote from the SPD 110a, 110b, and 110c, such as the SPD management system 130 or another one of the SPDs 110a, 110b, and 110c.

The SPDs 110a, 110b, and 110c may communicate with the SPD management system 130 or other SPDs 110a, 110b, and 110c over the network 135 using, for example, one or more wired or wireless protocols. These communication protocols may include, but are not limited to, a cellular communication protocol, a WiFi communication protocol, a Bluetooth communication protocol, and/or a near field communication (NFC) communication protocol. The network 135 may be a global network, such as the Internet or other publicly accessible network. Various elements of the network 135 may be interconnected by a wide area network, a local area network, an Intranet, and/or other private network, which may not be accessible by the general public. Thus, the communication network 135 may represent a combination of public and private networks or a virtual private network (VPN). The network 135 may be a wireless network, a wireline network, or may be a combination of both wireless and wireline networks. In accordance with some embodiments of the inventive concept, the SPDs 110a, 110b, and 110c may be located in geographically diverse locations relative to the SPD management system 130 and/or each other. For example, one or more of the SPDs 110a, 110b, and 110c and the SPD management system 130 may be in a same installation or, in other embodiments, one or more of the SPDs 110a, 110b, and 110c and the SPD management system 130 may be deployed in different installations. Thus, the SPD management system 130 may provide local monitoring of the SPDs 110a, 110b, and 110c or may provide networked or cloud-based monitoring of the SPDs 110a, 110b, and 110c.

Although FIG. 1 illustrates an example communication network 100, it will be understood that embodiments of the inventive concept are not limited to such configurations, but are intended to encompass any configuration capable of carrying out the operations described herein.

Figure 2:
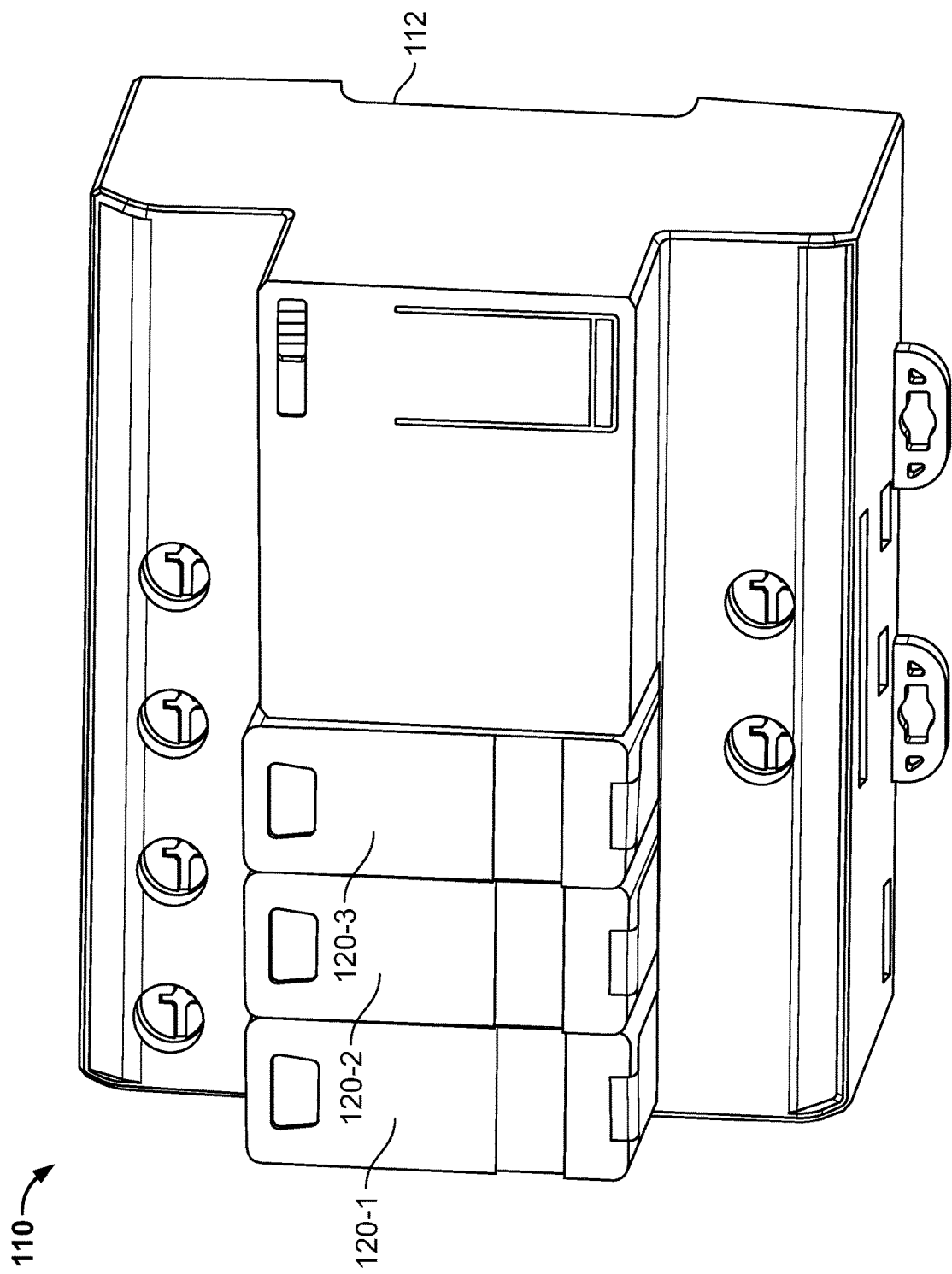
FIG. 2 is a perspective diagram of an SPD including a remote monitoring capability in accordance with some embodiments of the inventive concept.

FIG. 2 is a perspective diagram of an SPD 110 including a remote monitoring capability in accordance with some embodiments of the inventive concept. As shown in FIG. 2, an SPD 110, according to some embodiments of the inventive concept, may include multiple varistors 120-1, 120-2, and 120-3, which are positioned adjacent each other and coupled to a housing 112. One or more GDTs may be electrically connected to the varistors 120-1, 120-2, and 120-3 and also coupled to the housing 112. The GDT'(s) may, in some embodiments, not be visible in an external view of the housing 112. Thus, the housing, 112, varistors 120-1, 120-2, and 120-3 may be viewed as a unitary object that is joined together as multiple pieces or components, but may be manipulated as a single structural element.

Figure 3:
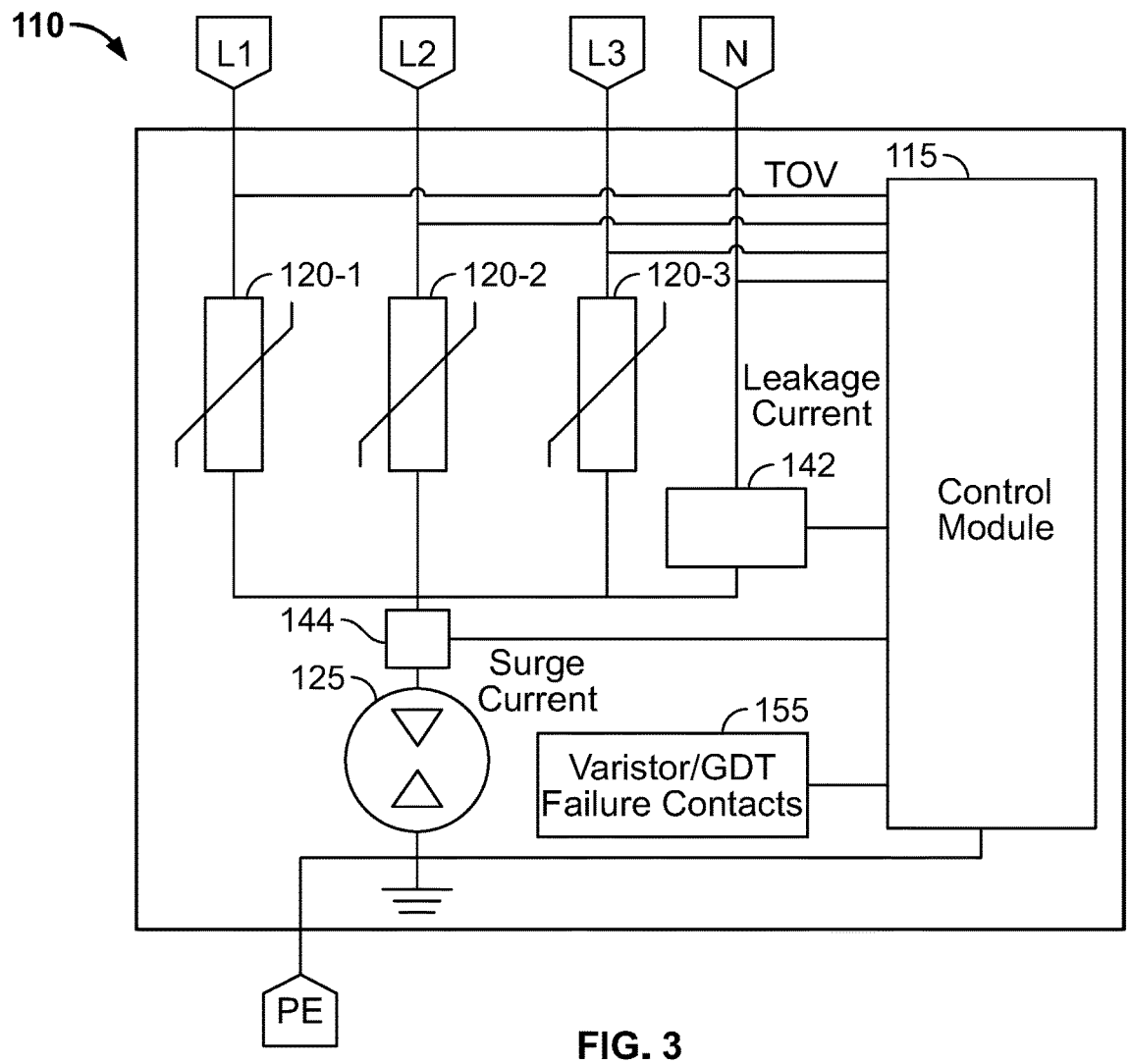
FIG. 3 is a block diagram of an SPD including a remote monitoring capability in accordance with some embodiments of the inventive concept.

FIG. 3 is a block diagram of an SPD 110 including a remote monitoring capability in accordance with some embodiments of the inventive concept. Referring to FIG. 3, the SPD 100 comprises three varistors 120-1, 120-2, and 120-3, which are coupled to three power lines L1, L2, and L3 corresponding to three-phase electrical power signals, respectively, and a neutral line N. In some embodiments, the varistors 120-1, 120-2, and 120-3 may be metal oxide varistors (MOVs). The SPD 110 further comprises a GDT 125, which is coupled between the varistors 120-1, 120-2, and 120-3 and a protective earth (PE) terminal. While three varistors 120-1, 120-2, and 120-3 are shown in FIG. 3, it will be understood that more or fewer varistors may be used in accordance with different embodiments of the inventive concept. Similarly, while one GDT 125 is shown in FIG. 3, additional GDTs may be used in other embodiments of the inventive concept.

While both GDTs and MOVs may be used in SPDs, such as the SPD 110 of FIG. 3, both GDTs and MOVs have advantages and drawbacks in shunting current away from sensitive electronic components in response to overvoltage surge events. For example, MOVs may have the advantage of responding rapidly to surge events and being able to dissipate the power associated with surge events. But MOVs may have the disadvantages of having increased capacitance relative to GDTs and passing a leakage current therethrough even in ambient conditions. MOVs may also have a decreased lifetime expectancy relative to GDTs. GDTs may have the advantage of having extremely low to no leakage current, minimal capacitance, and an increased lifetime expectancy relative to MOVs. But GDTs may not be as responsive to surge events as MOVs. Moreover, when a GDT fires and transitions into the arc region in response to a surge event, the GDT may remain in a conductive state if the ambient voltage on the line to which the GDT is connected exceeds the arc voltage.

A GDT is a sealed device that contains a gas mixture trapped between two electrodes. The gas mixture becomes conductive after being ionized by a high voltage spike. This high voltage that causes the GDT to transition from a non-conducting, high impedance state to a conducting state is known as the sparkover voltage for the GDT. The sparkover voltage is commonly expressed in terms of a rate of rise in voltage over time. For example, a GDT may be rated so as to have a DC sparkover voltage of 500 V under a rate of rise of 100 V/s. When a GDT experiences an increase in voltage across its terminals that exceeds its sparkover voltage, the GDT will transition from the high impedance state to a state known as the glow region. The glow region refers to the time region where the gas in the GDT starts to ionize and the current flow through the GDT starts to increase. During the glow region, the current through the GDT will continue to increase until the GDT transitions into a virtual short circuit known as the arc region. The voltage developed across a GDT when in the arc region is known as the arc voltage and is typically less than 100 V. A GDT takes a relatively long time to trigger a transition from a high impedance state to the arc region state where it acts as a virtual short circuit. As a result, relatively high voltage transients may not be diverted to ground or other reference terminal and may be passed through to other circuitry.

A MOV when in a generally non-conductive state still conducts a relatively small amount of current caused by reverse leakage through diode junctions. This leakage current may generate a sufficient amount of heat that a device, such as a thermal disconnect mechanism, may be used to reduce the risk of damage to components of an SPD. When a transient overvoltage event occurs, an MOV may conduct little current until reaching a clamping voltage level at which point the MOV may act as a virtual short circuit. Typically, the clamping voltage is relatively high, e.g., several hundred volts, so that when an MOV passes a high current due to a transient over voltage event a relatively large amount of power may be dissipated.

Returning to FIG. 3, the control module 115 may include one or more signal conditioners, sensors, and the like to obtain one or more performance characteristics from the overvoltage protection circuit of the SPD 110, which may comprise the varistors 120-1, 120-2, 120-3, and the GDT 125. For example, as shown in FIG. 3, the control module 115 may be coupled to the varistors 120-1, 120-2, and 120-3 and lines L1, L2, L3, and N to receive transient overvoltage (TOV) information including, but not limited to, voltage magnitude, a timestamp associated with each TOV event, and/or a count of TOV events over specified time ranges. Based on the magnitude, timing, and/or count of various TOV events associated with one or more of the varistors 120-1, 120-2, and 120-3, the control module 115 may be configured to generate an alarm indicative of a specific one of the varistors 120-1, 120-2, and 120-3 having reached the end of its lifespan or is near the end of its lifespan and replacement may now be warranted. The control module 115 may be further coupled between the varistors 120-1, 120-2, 120-3 and the GDT 125 to receive leakage current information associated with respective ones of the varistors 120-1, 120-2, and 120-3 including, but not limited to, magnitudes of the leakage current and associated timestamps when the leakage current measurement was taken. A leakage current sensor 142 may be configured to generate a signal representative of the leakage current associated with respective ones of the varistors 120-1, 120-2, and 120-3. As shown in FIG. 3, the leakage current sensor 142 may be coupled between the common line N and the control module 115, which may facilitate monitoring of leakage currents associated with the three varistors 120-1, 120-2, and 120-3 using a single connection. The signal may comprise leakage current information including, but not limited to, magnitudes of the leakage current and associated timestamps when the leakage current measurement was taken. In some embodiments, the leakage current sensor 142 may comprise one or more transformers that are configured to generate a signal responsive to the leakage current associated with one or more of the varistors 120-1, 120-2, and 120-3. Based on the magnitude and/or timing of various leakage current measurements associated with a varistor 120-1, 120-2, and 120-3, the control module 115 may be configured to generate an alarm indicative of the varistor 120-1, 120-2, and 120-3 having reached the end of its lifespan or is near the end of its lifespan and replacement may now be warranted.

The control module 115 may be further coupled between the varistors 120-1, 120-2, 120-3 and the GDT 125 to receive surge current information that flows through the GDT 125 including, but not limited to magnitudes of the surge current, associated timestamps when the surge current measurement was taken, and/or a count of surge current events over specified time ranges. A surge current sensor 144 may be configured to generate a signal representative of the surge current that flows through the GDT 125. The signal may comprise surge current information including, but not limited to, magnitudes of the surge current, associated timestamps when the surge current measurement was taken, and/or a count of surge current events over specified time ranges. In some embodiments, the surge current sensor 144 may comprise one or more transformers that are configured to generate a signal responsive to the surge current associated with the GDT 125. A transformer used in the surge current sensor 144 may be configured so as to be mounted over the GDT 125 in some embodiments of the inventive concept. Similar to the varistors 120-1, 120-2, 120-, the control module 115 may be configured to generate an alarm indicative of the GDT 125 having reached the end of its lifespan or is near the end of its lifespan and replacement may now be warranted based on the TOV event information and/or the surge current event information. The SPD 110 may further include a varistor/GDT failure contacts module 155, which is connected to the control module 115 and may be configured to provide an indication when one or more of the varistors 120-1, 120-2, 120-3 and/or the GDT 125 has failed (e.g., short circuited) and is no longer operative for its intended purpose of shunting current from overvoltage and/or surge current events to ground or PE. The control module 115 may be configured to generate a failure alarm in response to detecting a failure or one or more of the varistors 120-1, 120-2, 120-3 and/or the GDT 125.

Figure 4:
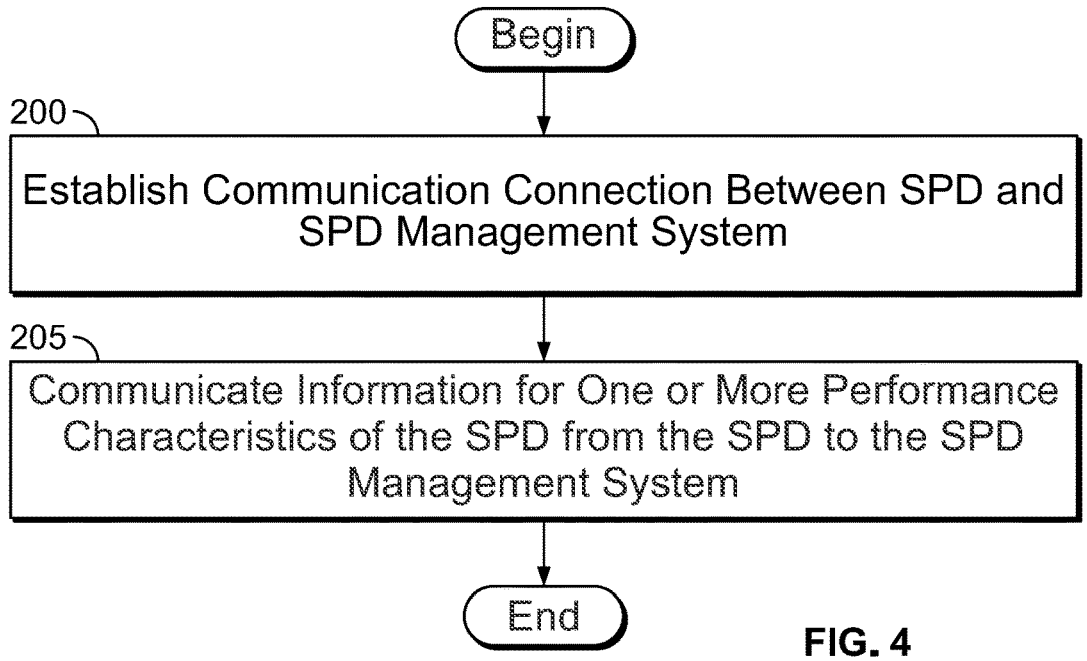
FIG. 4 is a flowchart that illustrates operations for monitoring SPDs via an SPD management system in accordance with some embodiments of the inventive concept.

FIG. 4 is a flowchart that illustrates operations for monitoring SPDs 110a, 110b, and 110c via an SPD management system 130 in accordance with some embodiments of the inventive concept. Referring now to FIG. 4, operations begin at block 200 where a communication connection is established between one or more of the SPDs 110a, 110b, and 110c and the SPD management system 130. As described above, the communication connection may comprise one or more wired or wireless connections. A variety of different communication protocols may be used including, but not limited to, a cellular communication protocol, a WiFi communication protocol, a Bluetooth communication protocol, and/or a near field communication (NFC) communication protocol. At block 205, information for one or more performance characteristics of one or more SPDs 110a, 110b, and 110c is communicated from the one or more SPDs 110a, 110b, and 110c to the SPD management system 130. The SPD management system 130 may use the performance characteristic information obtained from the one or more SPDs 110a, 110b, and 110c to evaluate the status of the SPDs 110a, 110b, and 110c individually as well as an overview of the protection provided to a facility in which the SPDs 110a, 110b, and 110c may be deployed based on their operational statuses and their particular geolocations.

Figure 5:
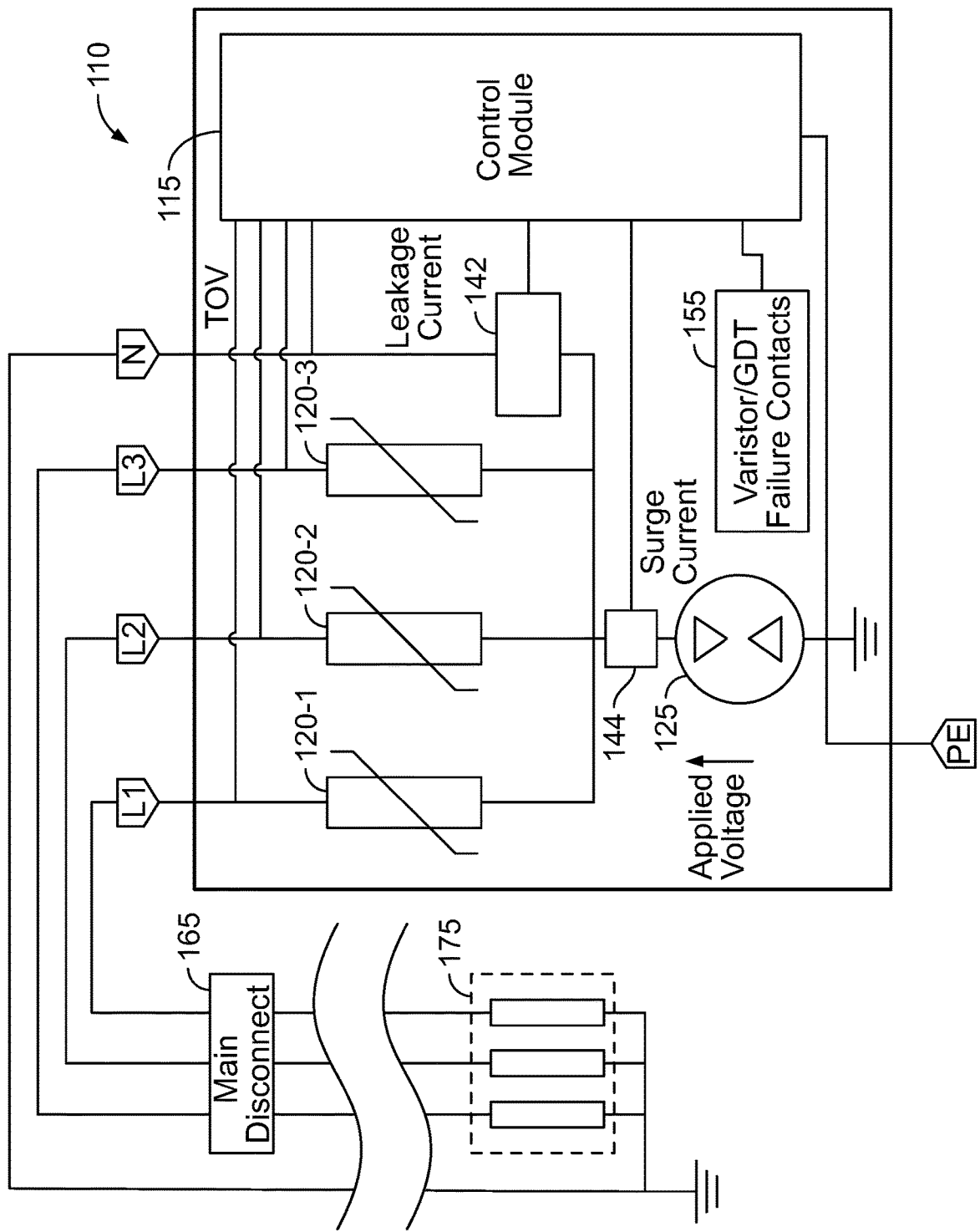
FIGS. 5 and 6 are block diagrams that illustrate performing different types of impedance measurements for SPDs deployed at an installation in accordance with some embodiments of the inventive concept.
Figure 6:
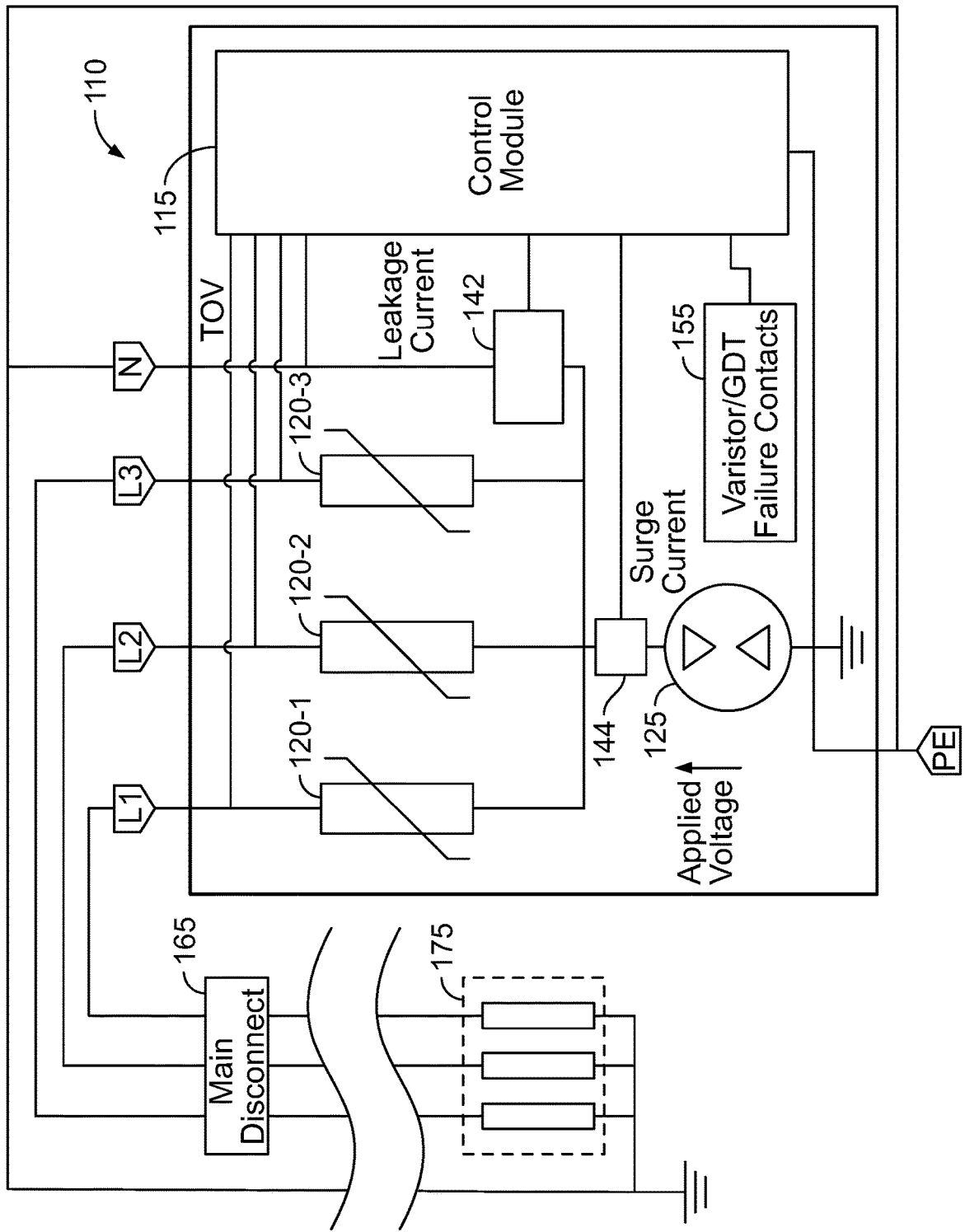

FIGS. 5 and 6 are block diagrams that illustrate performing different types of impedance measurements for an SPD 110 deployed at an installation in accordance with some embodiments of the inventive concept. FIG. 5 illustrates a system in which an installation is connected to a power system in a TT (terre-terre) earthing arrangement. In a TT earthing system, SPD 110 is coupled to the power generator transformer 175 via a main disconnect 165. The protective earth (PE) connection for the SPD 110 is provided by a local earth electrode and there is another independently installed PE connection at the power generator transformer 175. There is no earth wire connection between the two. The fault loop impedance is generally higher. In some embodiments of the inventive concept, the control module 115 may be configured to measure the fault loop impedance in the TT configuration of FIG. 5 through application of an applied voltage across the GDT 125. Thus, the impedance of a galvanic loop, which includes the control module 115 of the SPD 110 therein, formed between one power line of a three-phase power line configuration originating at the power generator transformer 175 and a neutral line may be measured. An advantage of the TT earthing system is the reduced conducted interference from other users' connected equipment. TT earthing arrangements have often been used for special applications like telecommunication sites that benefit from the interference-free earthing. Also, TT networks generally do not pose any serious risks in the case of a broken neutral line. In addition, in locations where power is distributed overhead, earth conductors are generally not at risk of becoming live should any overhead distribution conductor be fractured by, for example, a fallen tree or branch.

FIG. 6 illustrates a system in which an installation is connected to a power system in a TN earthing arrangement. In a TN earthing system, at least one of the points in the power generator transformer 175 is connected with earth, which may be the star point in a three-phase system. The SPD 110 is coupled to the power generator transformers 175 via a main disconnect 165 and is connected with earth via the PE connection at the power generator transformer 175. The TN earthing system arrangement is a common standard for residential and industrial electrical systems. In some embodiments of the inventive concept, the control module 115 may be configured to measure the fault loop impedance in the TN configuration of FIG. 6 through application of an applied voltage across the GDT 125. Thus, the impedance of a galvanic loop, which includes the control module 115 of the SPD 110 therein, formed between one power line of a three-phase power line configuration originating at the power generator transformer 175 and a protective earth terminal may be measured.

Figure 7:
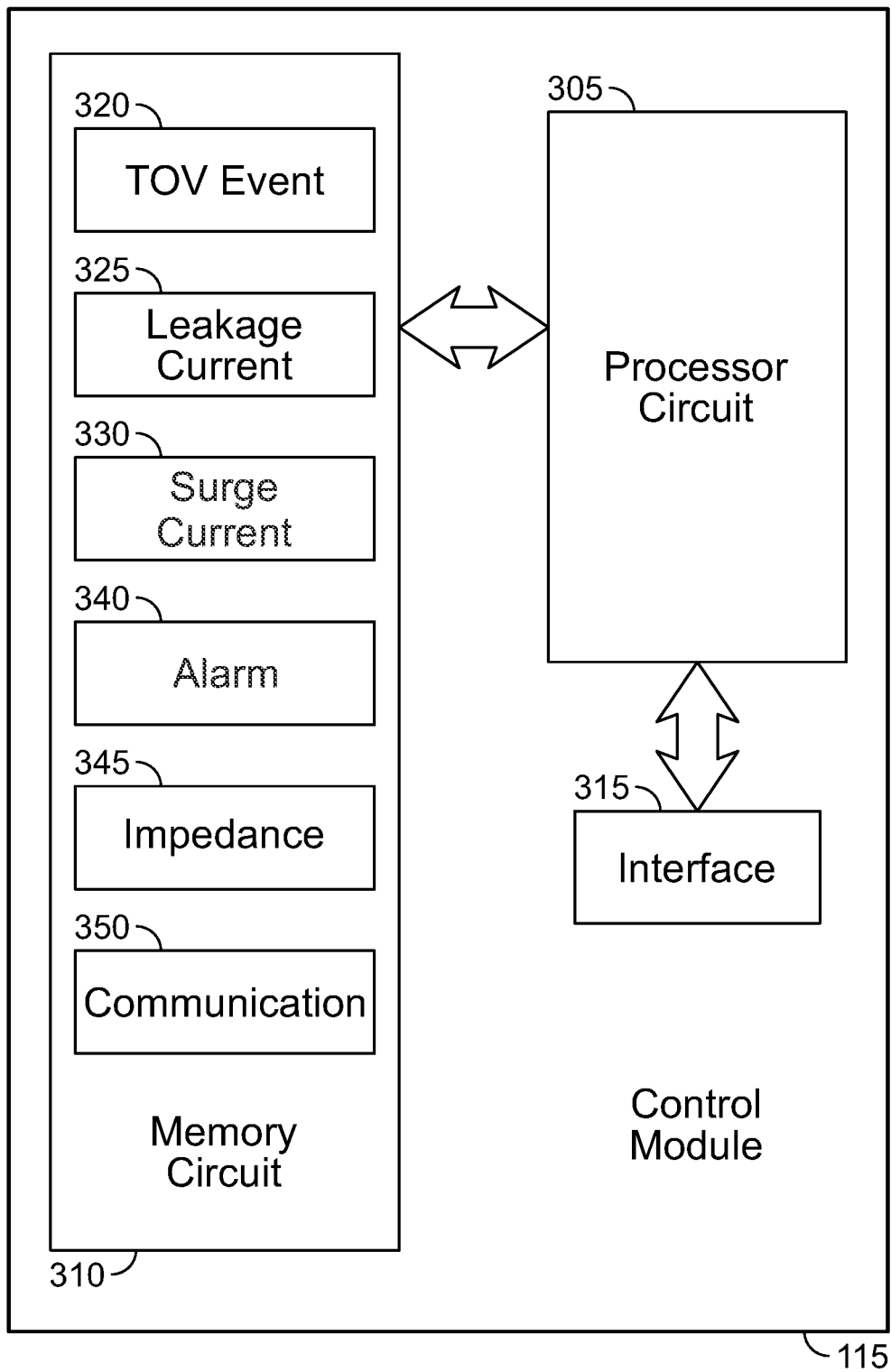
FIG. 7 is a simplified block diagram of an SPD in accordance with some embodiments of the inventive concept.

FIG. 7 is a simplified block diagram of the control module 115a, 115b, and 115c of FIG. 1 that is configured to perform operations according to one or more embodiments disclosed herein in accordance with some embodiments of the inventive concept. The control module 115 comprises a processor circuit 305, a memory circuit 310, and an interface 315. The interface 315 may comprise a wireless and/or a wired interface, such as a wireless transceiver and a network adapter. The wireless transceiver and the network adapter may be configured to provide the control module 115 with wireless and wireline communication functionality, respectively. The processor circuit 305 may comprise one or more data processing circuits, such as a general purpose and/or special purpose processor, e.g., microprocessor and/or digital signal processor. The processor circuit 305 is configured to execute computer readable program code including a TOV event module 320, a leakage current module 325, a surge current module 330, an alarm module 340, an impedance module 345, and a communication module 350. The TOV event module may be configured to receive and/or perform analytics on TOV information including, but not limited to, voltage magnitude, a timestamp associated with each TOV event, and/or a count of TOV events over specified time ranges. Based on the magnitude, timing, and/or count of various TOV events associated with one or more of the varistors 120-1, 120-2, and 120-3, the TOV event module 320 in cooperation with the alarm module 340 may be configured to generate an alarm indicative of a specific one of the varistors 120-1, 120-2, and 120-3 having reached the end of its lifespan or is near the end of its lifespan and replacement may now be warranted. The leakage current module 325 may be configured to receive and/or perform analytics on leakage current information associated with respective ones of the varistors 120-1, 120-2, and 120-3 including, but not limited to, magnitudes of the leakage current and associated timestamps when the leakage current measurement was taken. Based on the magnitude and/or timing of various leakage current measurements associated with a varistor 120-1, 120-2, and 120-3, the leakage current module 325 in cooperation with the alarm module 740 may be configured to generate an alarm indicative of the varistor 120-1, 120-2, and 120-3 having reached the end of its lifespan or is near the end of its lifespan and replacement may now be warranted. The surge current module 330 may be configured to receive and/or perform analytics on surge current information that flows through the GDT 125 including, but not limited to magnitudes of the surge current, associated timestamps when the surge current measurement was taken, and/or a count of surge current events over specified time ranges. Similar to the varistors 120-1, 120-2, 120-3 and the leakage current module 325, the surge current module 330 in cooperation with the alarm module 740 may be configured to generate an alarm indicative of the GDT 125 having reached the end of its lifespan or is near the end of its lifespan and replacement may now be warranted based on the TOV event information and/or the surge current event information. The alarm module 340 may be configured to cooperate with the TOV event module 320, leakage current module 325, and surge current module 330 to generate alarms or notifications as described above. The alarm module 340 may be further configured to receive and/or perform analytics on information received from the varistor/GDT failure contacts module 155 that indicates when one or more of the varistors 120-1, 120-2, 120-3 and/or the GDT 125 has failed (e.g., short circuited) and is no longer operative for its intended purpose of shunting current from overvoltage and/or surge current events to ground or PE. The alarm module 340 may be configured to generate a failure alarm in response to detecting a failure or one or more of the varistors 120-1, 120-2, 120-3 and/or the GDT 125. The impedance module 345 may be configured to generate a measurement of the fault loop impedance for an SPD 110 coupled to a power system in a TT arrangement of FIG. 5 and/or the TN arrangement of FIG. 6. The communication module 350 may be configured to implement one or more wired and/or wireless communication protocols including, but not limited to, a cellular communication protocol, a WiFi communication protocol, a Bluetooth communication protocol, and/or a near field communication (NFC) communication protocol, to facilitate communication with the SPD management system 130 and/or other SPDs 110.

Figure 8:
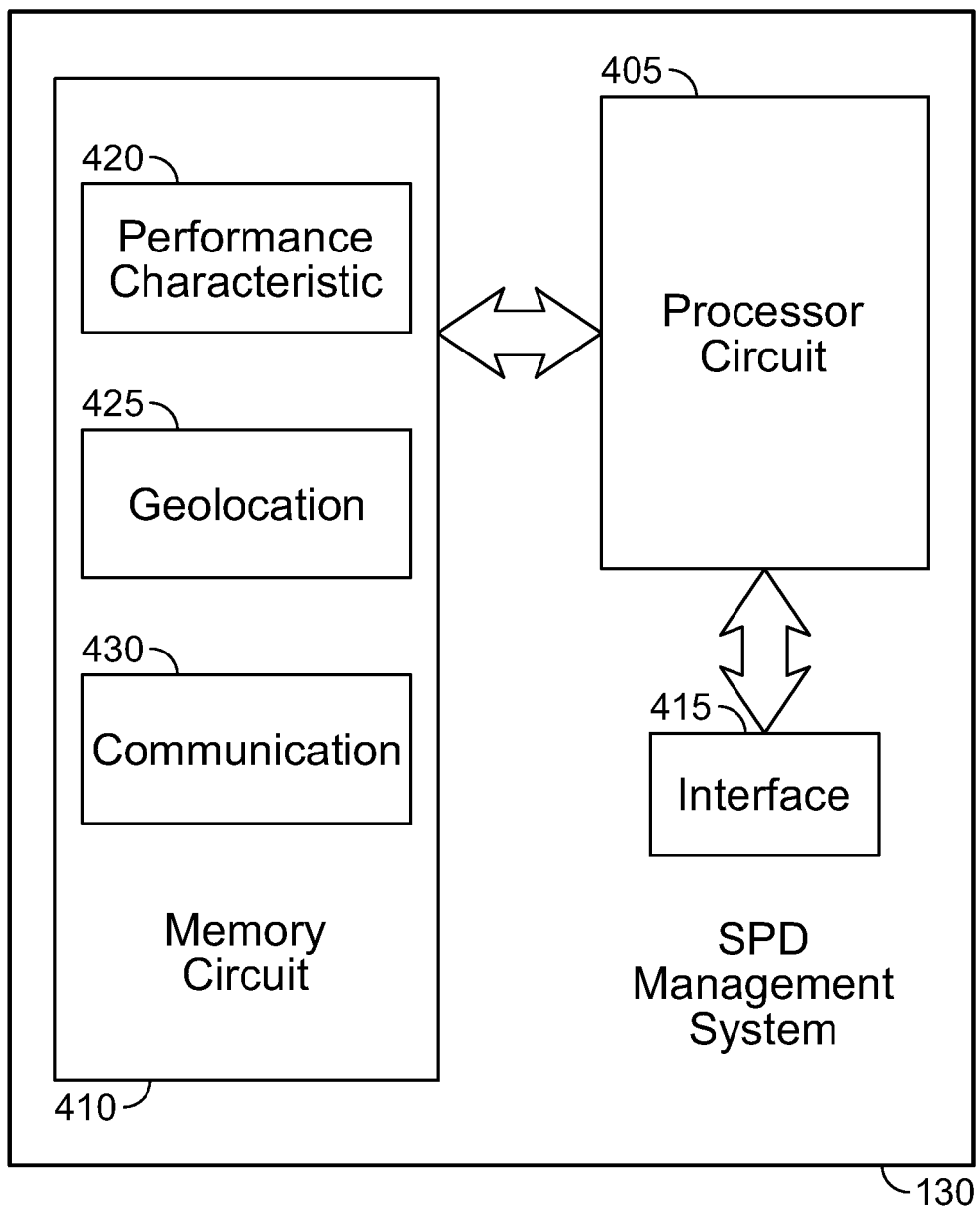
FIG. 8 is a simplified block diagram of an SPD management system in accordance with some embodiments of the inventive concept.

FIG. 8 is a simplified block diagram of the SPD management system 130 of FIG. 1 that is configured to perform operations according to one or more embodiments disclosed herein in accordance with some embodiments of the inventive concept. The SPD management system comprises a processor circuit 405, a memory circuit 410, and an interface 415. The interface 415 may comprise a wireless and/or a wired interface, such as a wireless transceiver and a network adapter. The wireless transceiver and the network adapter may be configured to provide the SPD management system 130 with wireless and wireline communication functionality, respectively. The processor circuit 405 may comprise one or more data processing circuits, such as a general purpose and/or special purpose processor, e.g., microprocessor and/or digital signal processor. The processor circuit 405 is configured to execute computer readable program code including performance characteristic module 420, a geolocation module 425, and a communication module 450. The performance characteristic module 420 may be configured to receive and/or perform analytics on one or more performance characteristics associated with an SPD 110a, 110b, and 110c including, but not limited to, TOV events, varistor 120-X leakage current, surge current events, varistor 120-X and/or GDT 125 failure, and/or fault loop impedance for TT and TN power system earthing arrangements described above with respect to FIGS. 5 and 6. The geolocation module 425 may be configured to receive and/or perform analytics using geolocation information associated with one or more SPDs 110a, 110b, and 110c. By associating the geolocation information with the performance characteristic information, an overview of protection may be obtained for multiple SPDs deployed and various locations throughout a facility or installation. The communication module 450 may be configured to implement one or more wired and/or wireless communication protocols including, but not limited to, a cellular communication protocol, a WiFi communication protocol, a Bluetooth communication protocol, and/or a near field communication (NFC) communication protocol, to facilitate communication with the SPDs 110 and/or other data processing system or devices. The communication module 450 may be further configured to implement a human-machine interface (HMI) input through, for example, a button and/or an HMI output through, for example, an indicative light. The user input may be used to change the functioning state of the SPDs 110a, 110b, and 110c, for example. The user output may be used to provide status information for the SPDs 110a, 110b, and 110c including, for example, alarm state operating state, and the like.

With reference to FIGS. 9-21, a transient voltage surge suppression (TVSS) or surge protective device (SPD) assembly 500 according to embodiments of the present invention are shown therein. The SPD assembly 500 is modular and includes three SPD modules 600-1, 600-2, 600-3 and a pedestal or base module 510. Each of the SPD modules 600-1, 600-2, 600-3 is pluggable into and removable from the base module 510. In particular, each of the SPD modules 600-1, 600-2, 600-3 can be individually removed and replaced in the event the SPD module 600-1, 600-2, 600-3 fails.

The illustrated SPD assembly 500 is configured to be mounted on the DIN rail and to protect a three-phase system using a "3+1" protection configuration. However, other mounting and protection configurations may be provided in accordance with some embodiments of the technology.

The SPD modules 600-1, 600-2, 600-3 may be constructed in generally or substantially the same manner. As used herein, the SPD module 600 refers to any one of the SPD modules 600-1, 600-2, 600-3.

The SPD assembly 510 embodies and corresponds to the SPD 110 of FIG. 3. The SPD modules 600-1, 600-2, 600-3 correspond in whole or in part to the varistors 120-1, 120-2, 120-3 of FIG. 3. The base module 510 includes the remainder of the circuit within the SPD 110 described with reference to and schematically depicted in FIG. 3. More particularly, the base module 510 includes a GDT 570 corresponding to the GDT 125, a surge current sensing transformer 560 corresponding to the surge current sensor 144, a leakage current sensing transformer 550 corresponding to the leakage current sensor 142, and a control circuit assembly 540 corresponding to the control module 115 (FIG. 3).

According to some embodiments and as shown, the SPD assembly 500 is configured, sized and shaped for mounting on a support rail 503. According to some embodiments, the support rail 503 is a DIN (Deutsches Institut für Normung e.V.) rail shown in FIG. 9 and is compliant with corresponding applicable DIN requirements or standards. The DIN rail 503 may be secured (e.g., by screws or other fasteners) to a suitable support structure such as a wall, for example, a rear wall of an electrical service utility cabinet. The base module 510 is removably mountable on the DIN rail 503. The pluggable surge protective device (SPD) modules 600-1, 600-2, 600-3 are in turn removably mountable on the base module 510.

In some embodiments, the maximum dimensions of the SPD assembly 500 are compliant with at least one of the following DIN (Deutsches Institut für Normung e.V.) Standards: DIN 43 880 (December 1988). In some embodiments, the maximum dimensions of the assembly 500 are compliant with each of these standards.

The base module 510 has a fore-aft or SPD module receiving axis A-A (FIG. 9) that extends transversely to and, in some embodiments, substantially perpendicular to the lengthwise axis B-B the DIN rail 503.

The base module 510 includes a housing 512. The housing 512 includes a rear section 516A, an upper leg or section 516B, a lower leg or section 516C, and a controller section 517. The housing 512 defines an enclosed internal cavity 514. According to some embodiments, the housing 512 is formed of an electrically insulating polymeric material. The housing 512 may be formed of any suitable material or materials. In some embodiments, the housing 512 is formed of a rigid polymeric material or metal (e.g., aluminum). Suitable polymeric materials may include polyamide (PA), polypropylene (PP), polyphenylene sulfide (PPS), or ABS, for example.

A DIN rail receiver channel 519 is defined in the rear side of the rear section 516A. Integral rail hook features 519A are located on one side of the channel 519 and a spring loaded DIN rail latch mechanism 519B is mounted on the other side of the channel 519. The features and components 519A, 519B are sized and configured to securely and releasably mount the base module 510 on a standard DIN rail as is known in the art.

Figure 11:
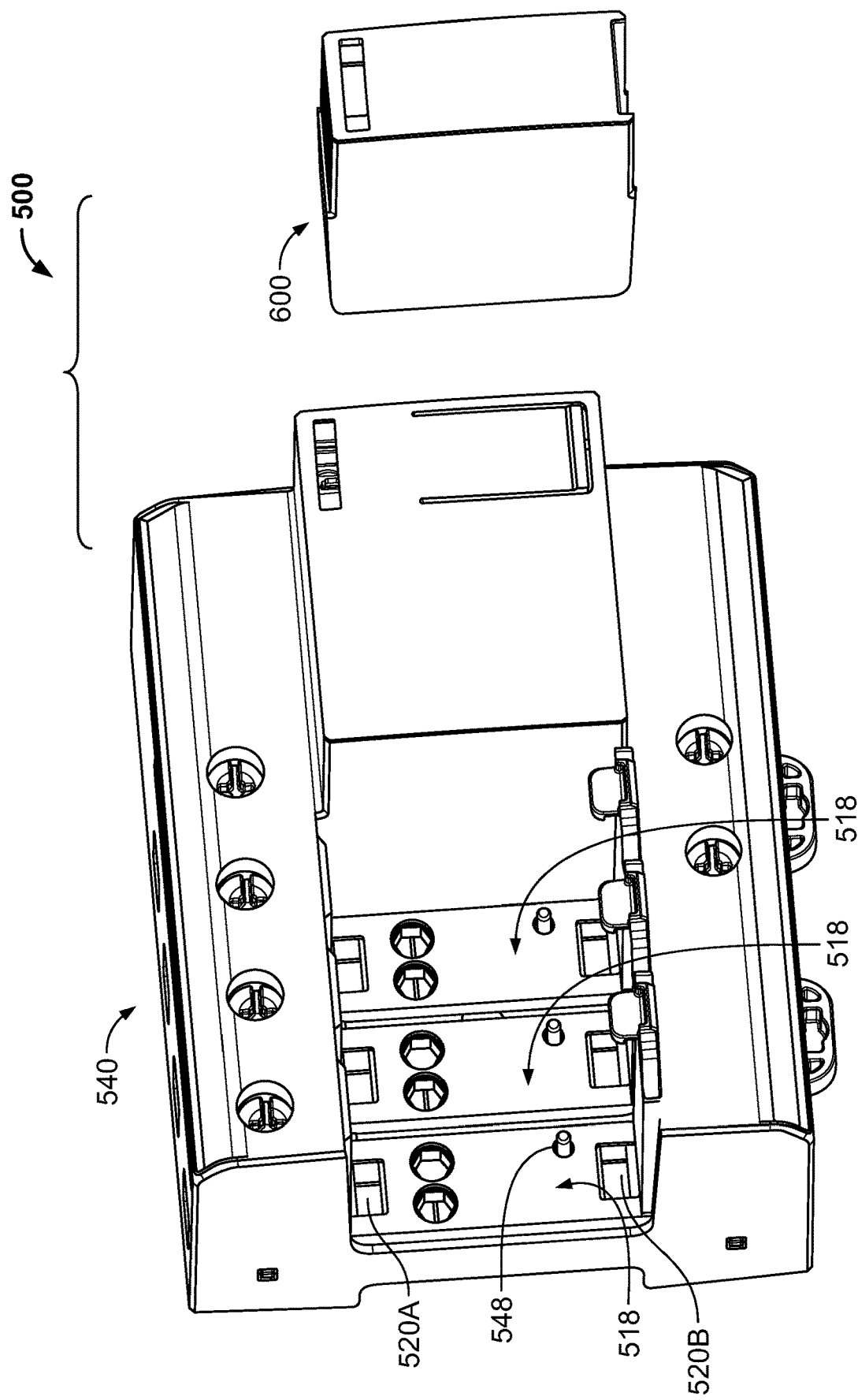
FIG. 11 is a front perspective view of the SPD assembly of FIG. 9 with SPD modules from a base module thereof.

With reference to FIG. 11, three receiver seats or slots 518 are defined in the front side of the base module 510 by the sections 516A-C. The receiver slots 518 are open from the front. In some embodiments and as show, the three receiver slots 518 are arranged immediately side-by-side.

Figure 12:
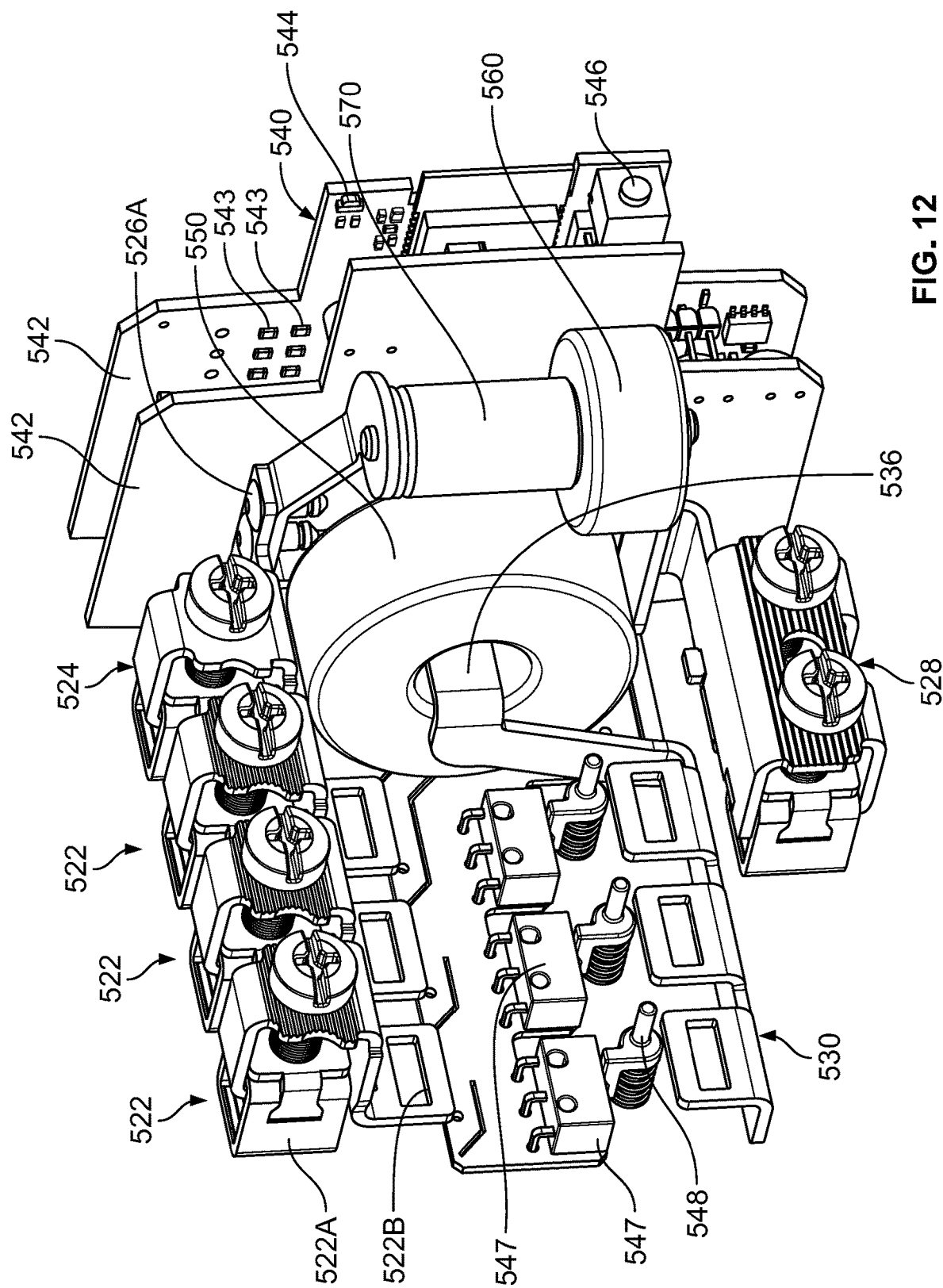
FIG. 12 is a fragmentary, front perspective view of the base module of the SPD assembly of FIG. 9.
Figure 13:
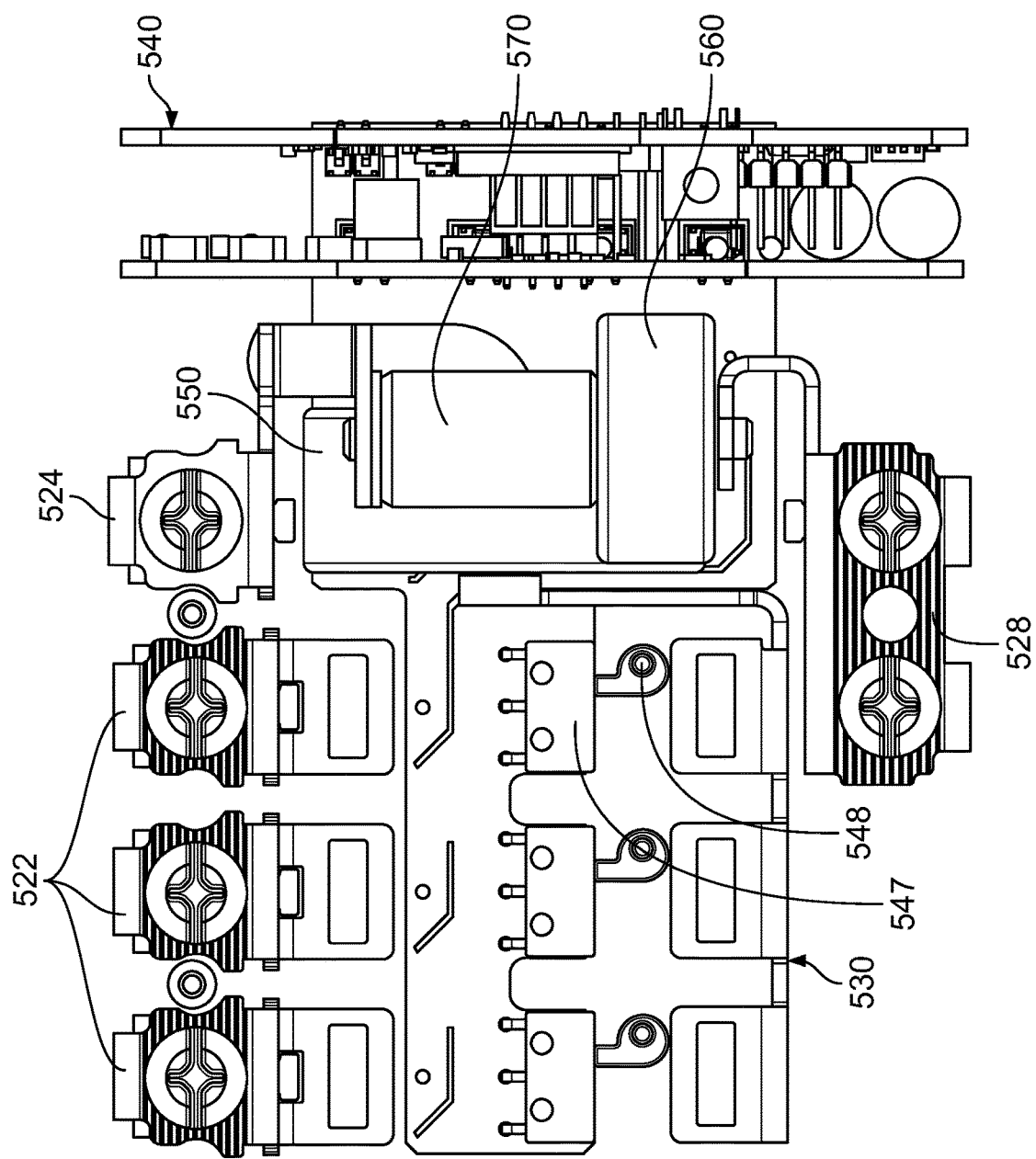
FIG. 13 is a fragmentary, front view of the base module of the SPD assembly of FIG. 9.

Upper contact openings 520A and lower contact openings 520B are defined in the front side or wall of the rear section 516A. With reference to FIG. 12, each receiver slot 518 is provided with a base terminal electrical connector assembly 522 mounted in the upper section 516B. Each connector assembly 522 includes a cable clamp connector 522A and a terminal contact connector socket 522B. A cable port 515A (FIG. 9) is defined in the upper section 516B for each connector assembly 522 to receive a terminal end of an electrical cable CL1, CL2, CL3 into the corresponding cable clamp connector 522A. Driver ports are provided in the upper section 516B to receive a driver to operate a threaded member (e.g., screw) of each associated cable clamp connector 522A. In some embodiments, each of the cable ports 515A and corresponding cable clamp connectors 522A is configured and intended to receive and electrically and mechanically connect with the respective line cable CL1, CL2, CL3.

A metal neutral (N) connection busbar 530 (FIG. 14) is located in the lower section 516C. The neutral busbar 530 includes three contact connector sockets 532 each located in a respective one of the receiver slots 518. The neutral busbar 530 includes a bent leg 534 extending away from the receiver slots 518. The leg 534 includes a distal end 530A and a sensing section 536 between the distal end 530A and the connector sockets 532. The distal end 530A is mechanically and electrically connected to an anode terminal 574T of the GDT 570.

A neutral terminal electrical connector assembly 524 (FIG. 14) is also mounted in the upper section 516B. The neutral connector assembly 524 includes a cable clamp connector 525 and a terminal 526. A neutral cable port 515B is defined in the upper section 516B to receive a terminal end of a neutral electrical cable CN into the cable clamp connector 525. A driver port is provided in the upper section 516B to receive a driver to operate a threaded member (e.g., screw) of the neutral cable clamp connector 525. The cable port 525B and the cable clamp connector 525 are configured and intended to receive and electrically and mechanically connect with the neutral cable CN. The terminal 526 is mechanically and electrically connected to the busbar leg 534 (e.g., using fasteners 526A) between the sensing section 536 and the busbar distal end 530A, and is thereby also connected to the anode terminal 574T of the GDT 570. The connection between the terminal 526 and the neutral busbar 530 also directly electrically connects the contact connector sockets 532 to the cable clamp connector 525 (for direct connection to the neutral line via the neutral electrical cable CN).

A protected earth (PE) or ground terminal electrical connector assembly 528 is mounted in the lower section 516C. The ground connector assembly 528 includes two cable clamp connectors 529. Ground cable ports 515C are defined in the lower section 516C to receive terminal ends of ground or PE electrical cables CP1, CP2 into the cable clamp connectors 529. Driver ports are provided in the lower section 516C to receive a driver to operate a threaded member (e.g., screw) of the ground cable clamp connectors 529. The cable ports 515C and the cable clamp connectors 529 are configured and intended to receive and electrically and mechanically connect with the PE electrical cables CP1, CP2. The ground connector assembly 528 is connected to a cathode terminal 576T of the GDT 570. The neutral busbar 530 and the neutral terminal electrical connector assembly 524 are electrically connected to the ground connector assembly 528 via the GDT 570 (when the GDT 570 is conducting).

The electrical circuit assembly 540 is mounted in the housing 512. The electrical circuit assembly 540 includes one or more printed circuit boards (PCBs) 542 and electrical components 543 corresponding to the electrical components of the control module 115 discussed above and shown in FIGS. 3, 7, and 8.

The electrical circuit assembly 540 (FIG. 12) includes an indicator light 544 (e.g., LED) is visible from the front side of the housing 512. The indicator light 544 may be used to indicate a condition of the SPD assembly 500 to a local user. For example, the indicator light 544 may be used to indicate that one or more of the SPD modules 600-1, 600-2, 600-3 has failed (e.g., thermally tripped).

The electrical circuit assembly 540 includes a reset switch 546 that is manually operable by a local user. For example, the reset switch may be a button switch and the housing 512 may include a flexible section 512A that can be pushed in to actuate the reset switch 546.

The electrical circuit assembly 540 further includes three module condition switches 547 (FIG. 12) disposed in the housing 512. The module condition switches 547 correspond to the varistor failure contacts 155 of the SPD of FIG. 3. Each module condition switch 547 is positioned in the rear of a respective one of the module receiver slots 518. Each switch 547 includes a spring-loaded remote control pin 548 that projects forwardly from the front side of the rear section 516A. Each switch 547 further includes switch electronics mounted on the PCB and connected to the control module 115 (FIG. 3). The switches 547 may be push-button microswitches, for example.

In some embodiments, the surge current sensor 560 (FIG. 14) is a current transformer (CT) sensor. The surge CT sensor 560 forms an annular structure, body or unit 562 having an axial through passage 564. The example surge CT sensor 560 includes a annular or toroidal magnetic core 565, a secondary winding 566 (e.g., copper wire), and an annular electrical insulation cover 563. The electrical insulation cover 563 is shown in dashed line transparency in FIG. 14 for the purpose of explanation. The magnetic core 565 defines a core passage 565A surrounding the through passage 564. The secondary winding 566 is helically wound about the magnetic core 565. The insulation cover 563 surrounds the magnetic core 565 and the secondary winding 566. The insulation cover 563 may be a rigid plastic housing or an electrical insulation tape wounds about the magnetic core 565, for example. The surge CT sensor 560 is operably electrically connected to the electrical assembly 540 by leads (e.g., electrically conductive wires; not shown) connected to either end of the secondary winding 566. In some embodiments, the CT sensor 560 is a solid core or ring core CT sensor.

The electrical insulation cover 563 may be a polymeric tape (e.g., a polyimide film such as KAPTON™ tape) wound about the core 565 and secondary winding 566. In some embodiments, the number of turns of the secondary winding 566 about the core 565 is in the range of from about 9 to 15.

Figure 14:
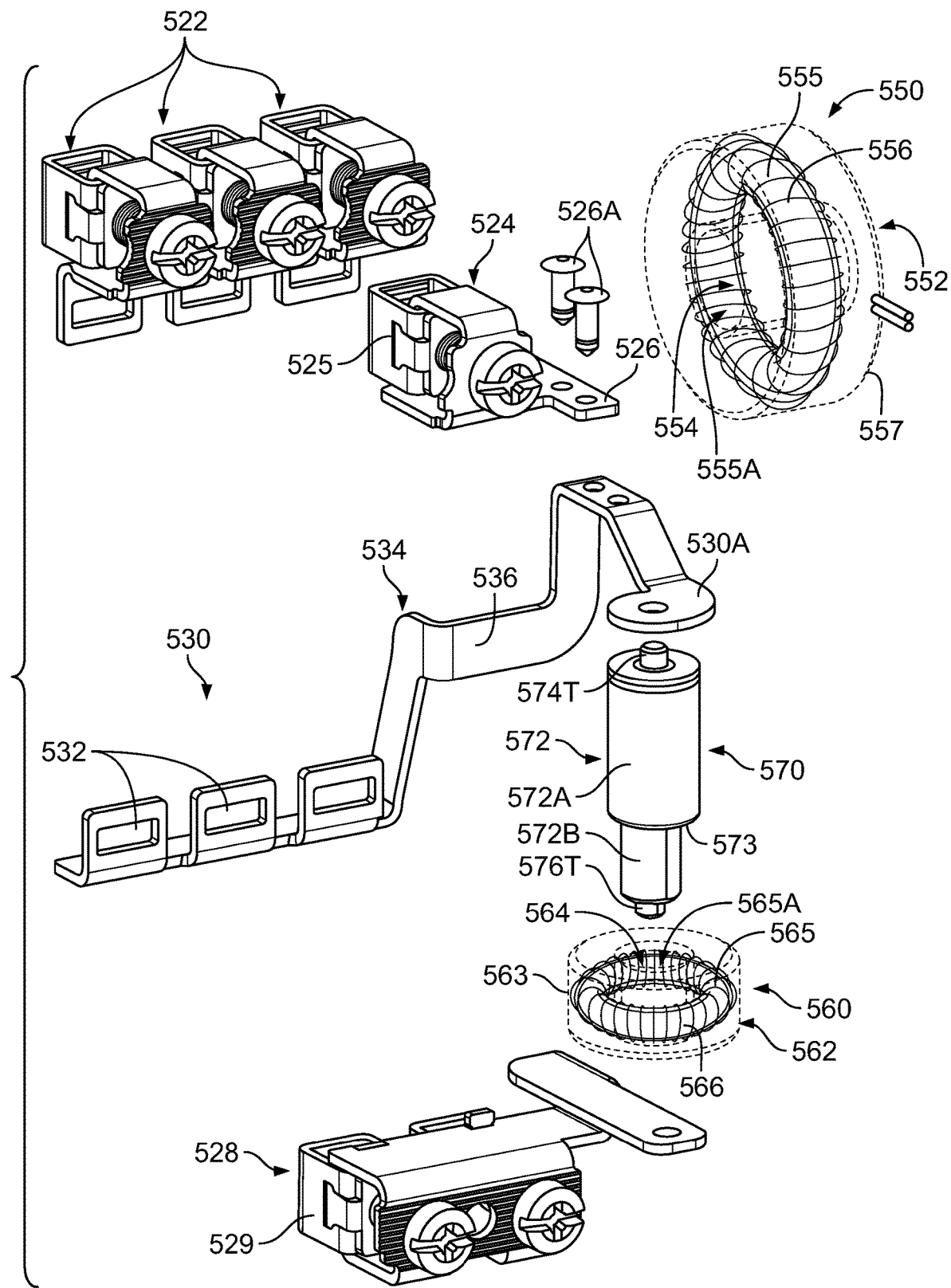
FIG. 14 is an exploded fragmentary, perspective view of the base module of the SPD assembly of FIG. 9.

In some embodiments, the leakage current sensor 550 (FIG. 14) is a current transformer (CT) sensor. The leakage CT sensor 550 forms an annular structure, body or unit 552 having an axial through passage 554. The example leakage CT sensor 550 includes an annular or toroidal magnetic core 555, a secondary winding 556 (e.g., copper wire), an annular electrical insulation cover 553 (surrounding the core 555 and secondary winding 556), and an annular outer cover 557 (surrounding electrical insulation cover 553). In FIG. 14, the electrical insulation cover 553 is not shown and the outer cover 557 is shown in dashed line transparency, for the purpose of explanation. The magnetic core 555 defines a core passage 555A surrounding the through passage 554. The secondary winding 556 is helically wound about the magnetic core 555. The leakage CT sensor 550 is operably electrically connected to the electrical assembly 540 by leads (e.g., electrically conductive wires; not shown) connected to either end of the secondary winding 556. The sensing section 536 of the busbar 530 extends through the passage 554 to enable the leakage CT sensor 550 to produce a current in the secondary winding 556 that is proportional to a leakage current through the busbar 530 between any of the SPD modules 600-1, 600-2, 600-3 and the neutral connector 524 (i.e., the neutral line N).

The insulation cover 553 surrounds the magnetic core 555 and the secondary winding 556. The insulation cover 553 may be a rigid plastic housing or an electrical insulation tape wounds about the magnetic core 555, for example. In some embodiments, the electrical insulation cover 553 is a polymeric tape (e.g., a polyimide film such as KAPTON™ tape) wound about the core 555 and secondary winding 556. In some embodiments, the number of turns of the secondary winding 556 about the core 555 is in the range of from about 2000 to 3000. In some embodiments, the outer cover 557 is formed of metal.

The GDT 570 (FIGS. 14 and 15) includes a body 572 and an anode terminal 574T and a cathode terminal 576T on opposed ends 570A, 570B of the body 572. The body 572 contains an anode 574, a cathode 576, and a spark gap chamber 577. An annular electrical insulator 579 (e.g., ceramic) may surround or form the body 572 between the terminals 574T, 576T.

Figure 15:
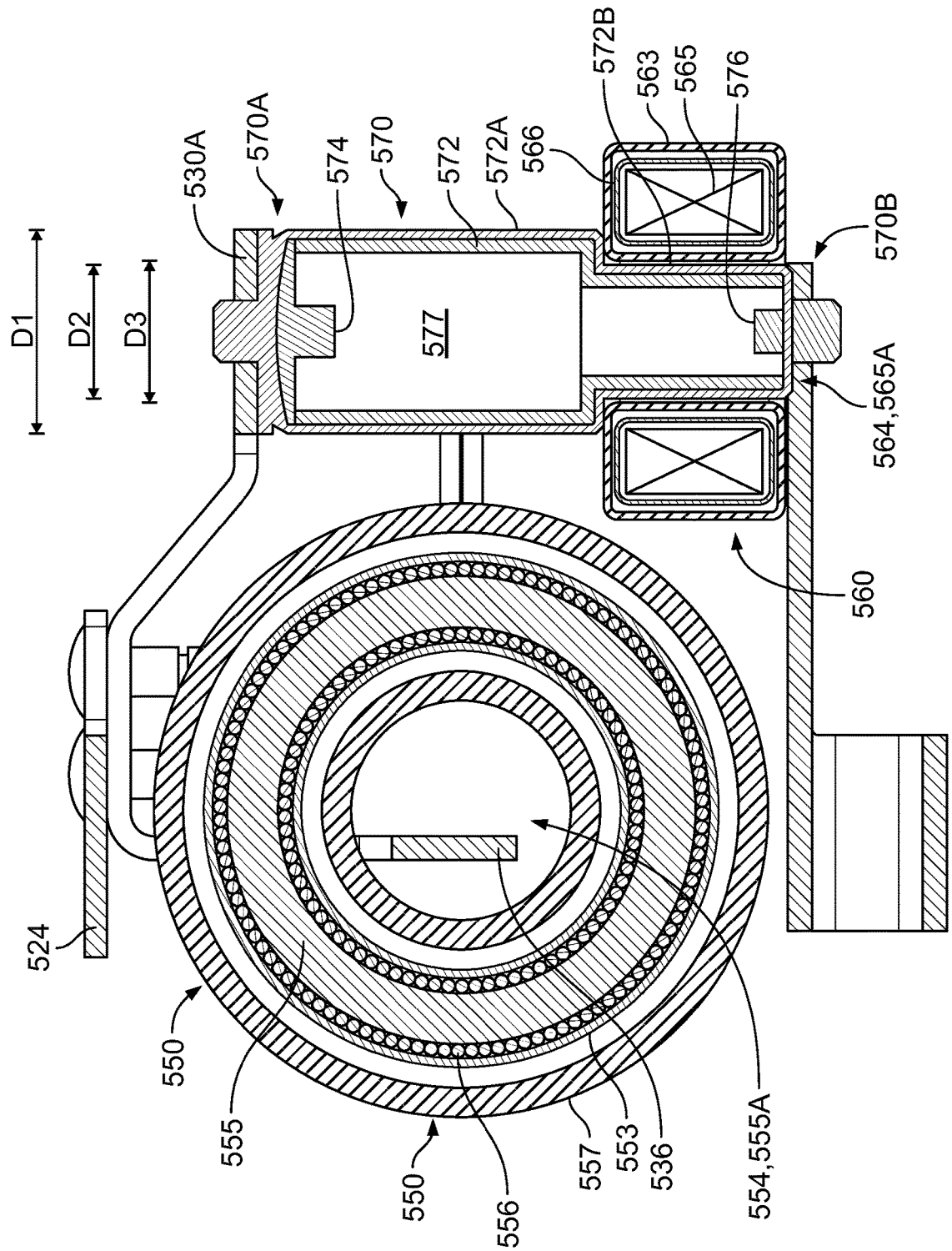
FIG. 15 is a fragmentary, cross-sectional view of the base module of the SPD assembly of FIG. 9.
Figure 16:
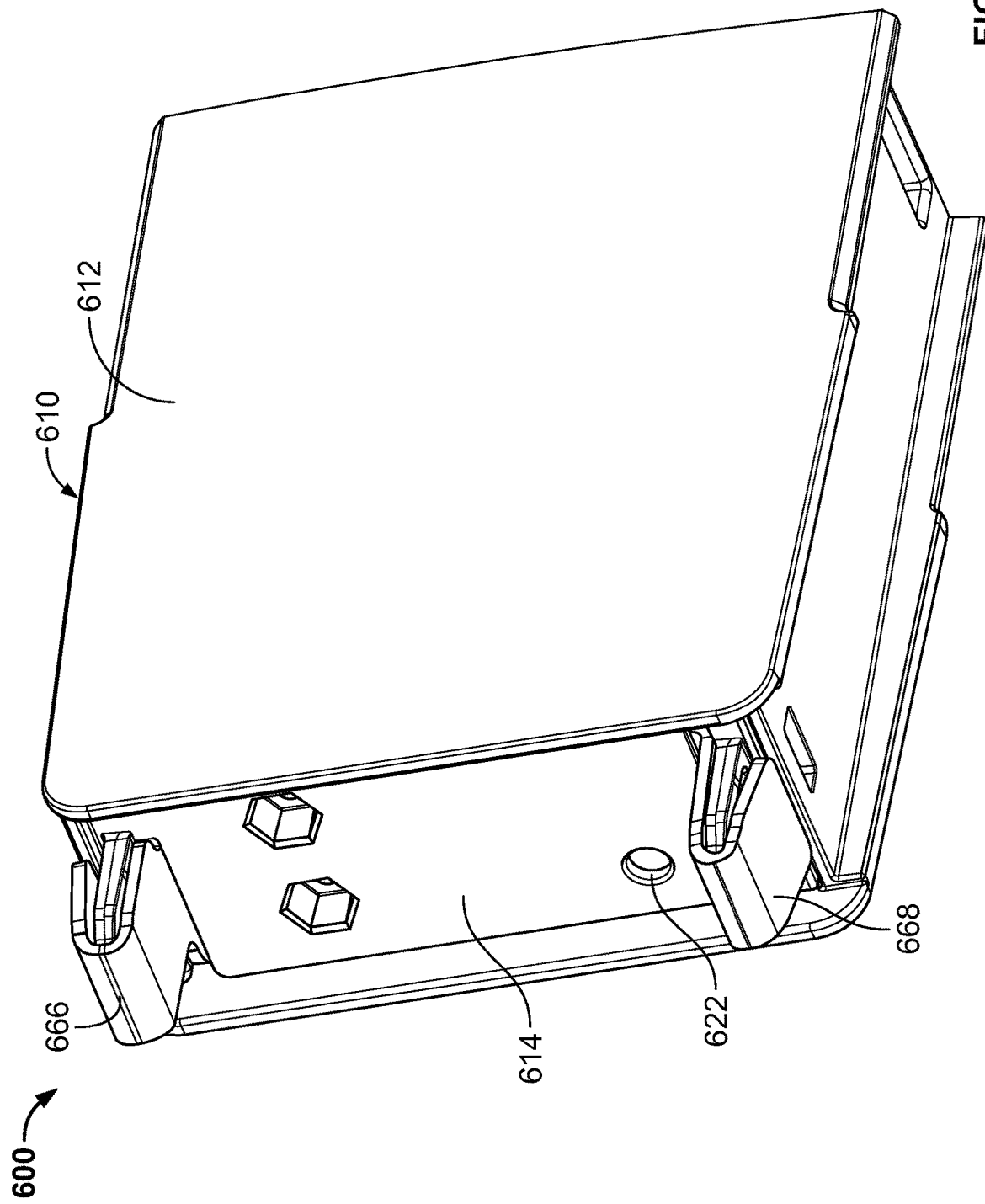
FIG. 16 is a rear perspective view of an SPD module of the SPD assembly of FIG. 9.
Figure 17:
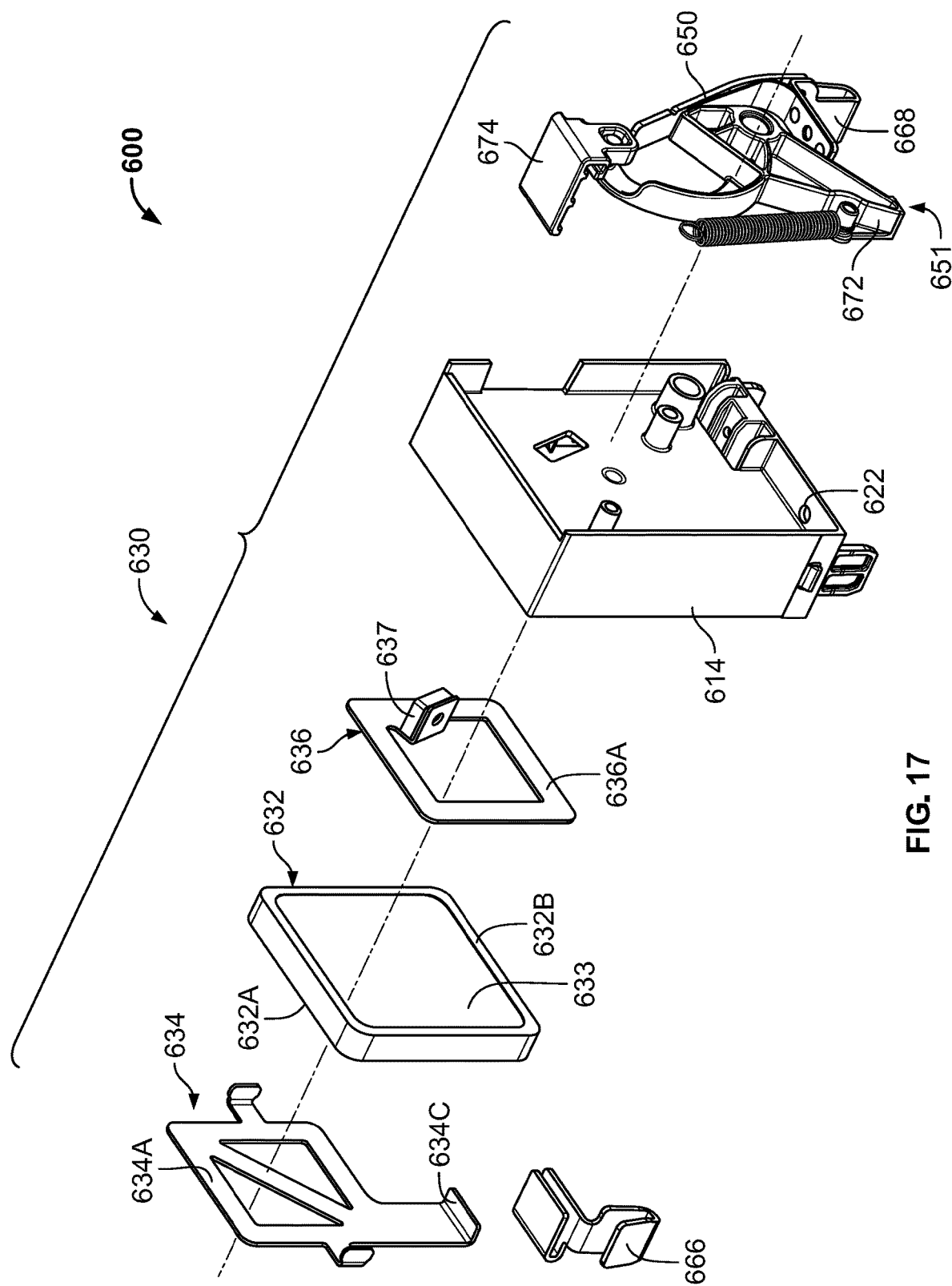
FIG. 17 is an exploded, perspective view of the SPD of FIG. 16.
Figure 18:
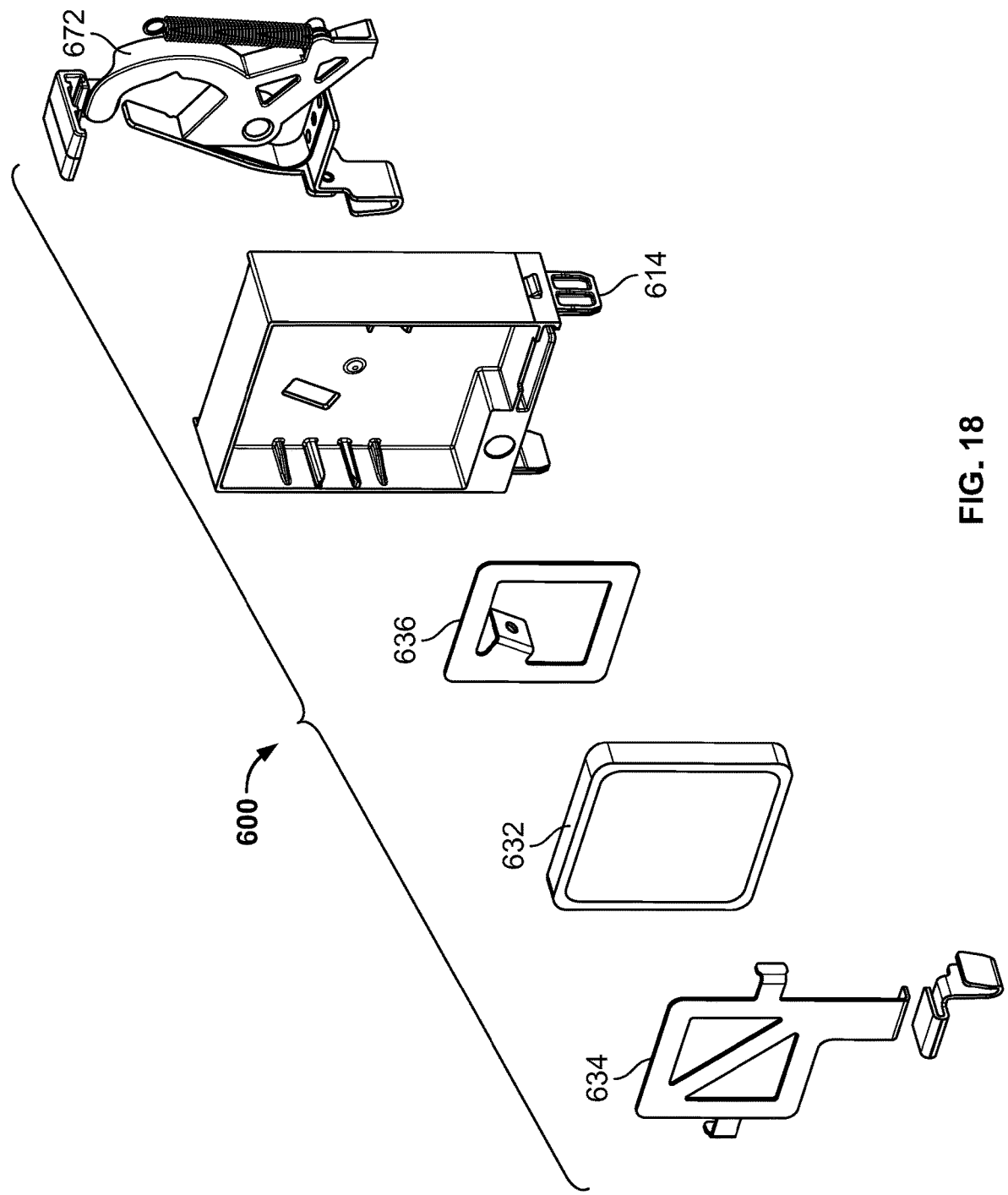
FIG. 18 is an exploded, perspective view of the SPD of FIG. 16.
Figure 19:
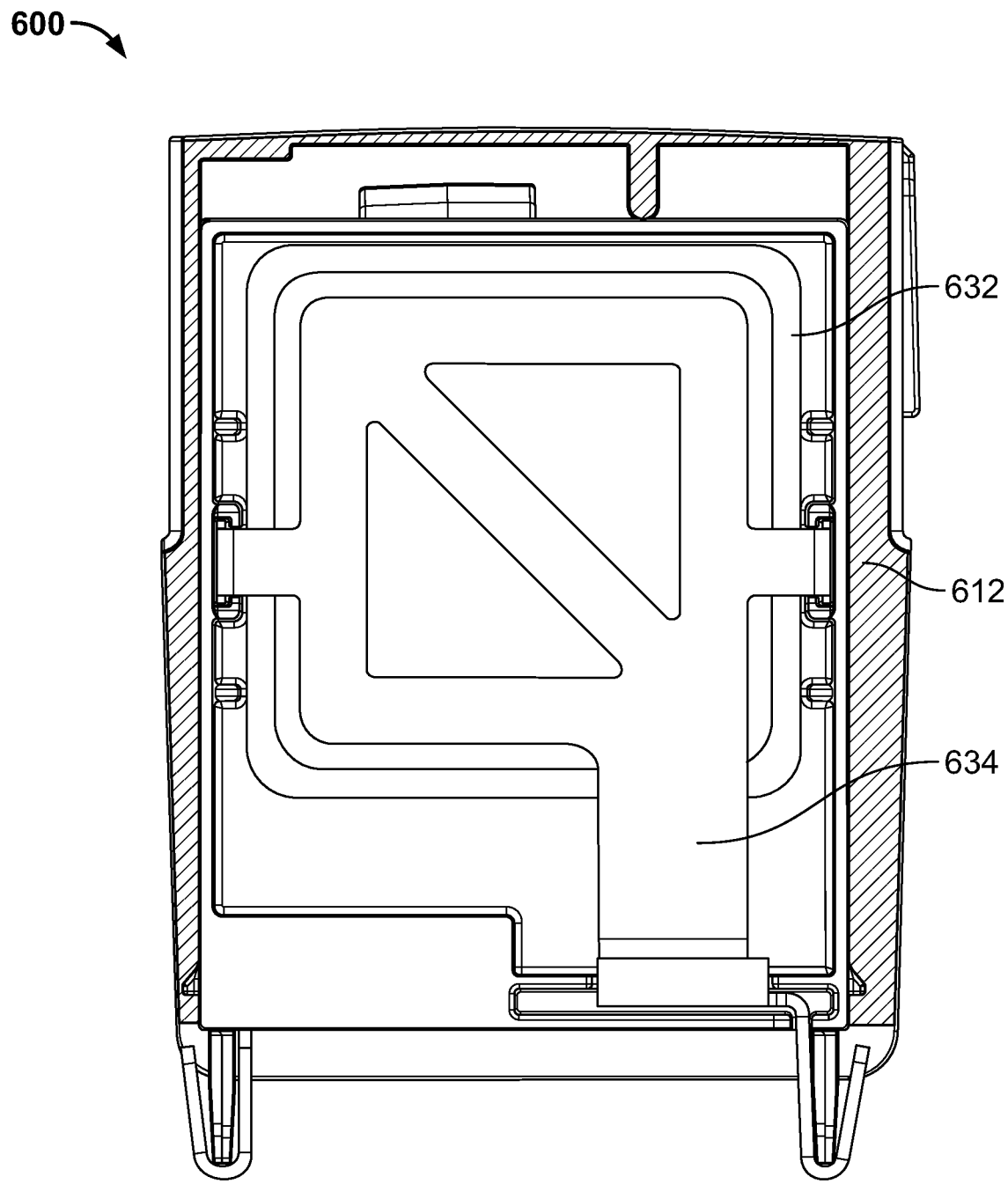
FIG. 19 is a fragmentary view of the SPD of FIG. 16 from a first side.

The GDT body 572 includes a first body section 572A extending from the anode terminal 574T to toward the cathode terminal 576T. The GDT body 572 further includes a second body section 572B extending from the inner end of the first body section 572A to the cathode terminal 576T. The first body section 572A has a first body outer width or diameter D1 (FIG. 15). The second body section 572B has a second body outer width or diameter D2. The second body outer diameter D2 is smaller than the first body outer diameter D1 so that an annular step 573 is defined between the sections 572A, 572B. In some embodiments and as shown, each of the GDT body sections 572A, 572B is cylindrically shaped.

In some embodiments, the second body outer diameter D2 is at least 1.5 mm less than the first body outer diameter D1.

In some embodiments, the GDT body 572 includes a hermetically or gas-tight sealed chamber or cell in which a selected gas is contained. The terminals 574T, 576T are electrically connected to the gas (e.g., by respective electrode portions in fluid contact with the contained gas). Below a prescribed spark over the voltage, the GDT 570 is electrically insulating between the terminals 574T, 576T. When an applied voltage across the terminals 574T, 576T exceeds the prescribed spark over voltage, the contained gas is ionized to cause electrical current to flow through the gas (by the Townsend discharge process) and thereby between the terminals 574T, 576T. Thus, the GDT 570 will selectively electrically insulate or conduct, depending on the applied voltage. The voltage required to initiate and sustain electrical conduction (discharge) will depend on the design characteristics of the GDT 570 (e.g., geometry, gas pressure, and gas composition).

The anode terminal 574T is mechanically and electrically connected to the distal end 530A of the neutral busbar 530 by a fastener (e.g., bolt), for example. The cathode terminal 576T is mechanically and electrically connected to the PE connector assembly 528 by a fastener (e.g., bolt), for example.

The GDT 570 is disposed in the passages 564. More particularly, the GDT lower body section 572B is disposed in the passage 564 and the core passage 565A. In some embodiments, the cathode terminal 576T extends outward beyond the CT sensor 560.

In some embodiments, as least a portion of the core 565 surrounds the region of the GDT 570 axially between the anode 574 and the cathode 576. In some embodiments, as least a portion of the core 565 surrounds the spark gap region of the GDT 570 axially between the anode 574 and the cathode 576. In some embodiments, as least a portion of the core 565 surrounds the anode 574 or the cathode 576.

In some embodiments, the inner diameter D3 (FIG. 15) of the surge CT sensor unit 562 is less than the outer diameter D1 of the GDT upper body section 572A. In some embodiments, the inner diameter D3 of the surge CT sensor unit 562 is at least 0.5 mm less than the outer diameter D1 of the GDT upper body section 572A.

In some embodiments, the inner diameter D3 of the surge CT sensor unit 562 is less than 1 mm greater than the outer diameter D2 of the GDT lower body section 572B.

The placement of the GDT 570 nested or disposed in the surge CT sensor 560 can facilitate a more compact form factor for the base module 510. Also, this arrangement can be used to mechanically support or position the surge CT sensor 560 with the GDT 570 and thereby stabilize the surge CT sensor 560 in the housing 512 and relative to the GDT 570 (i.e., the primary winding).

Figure 20:
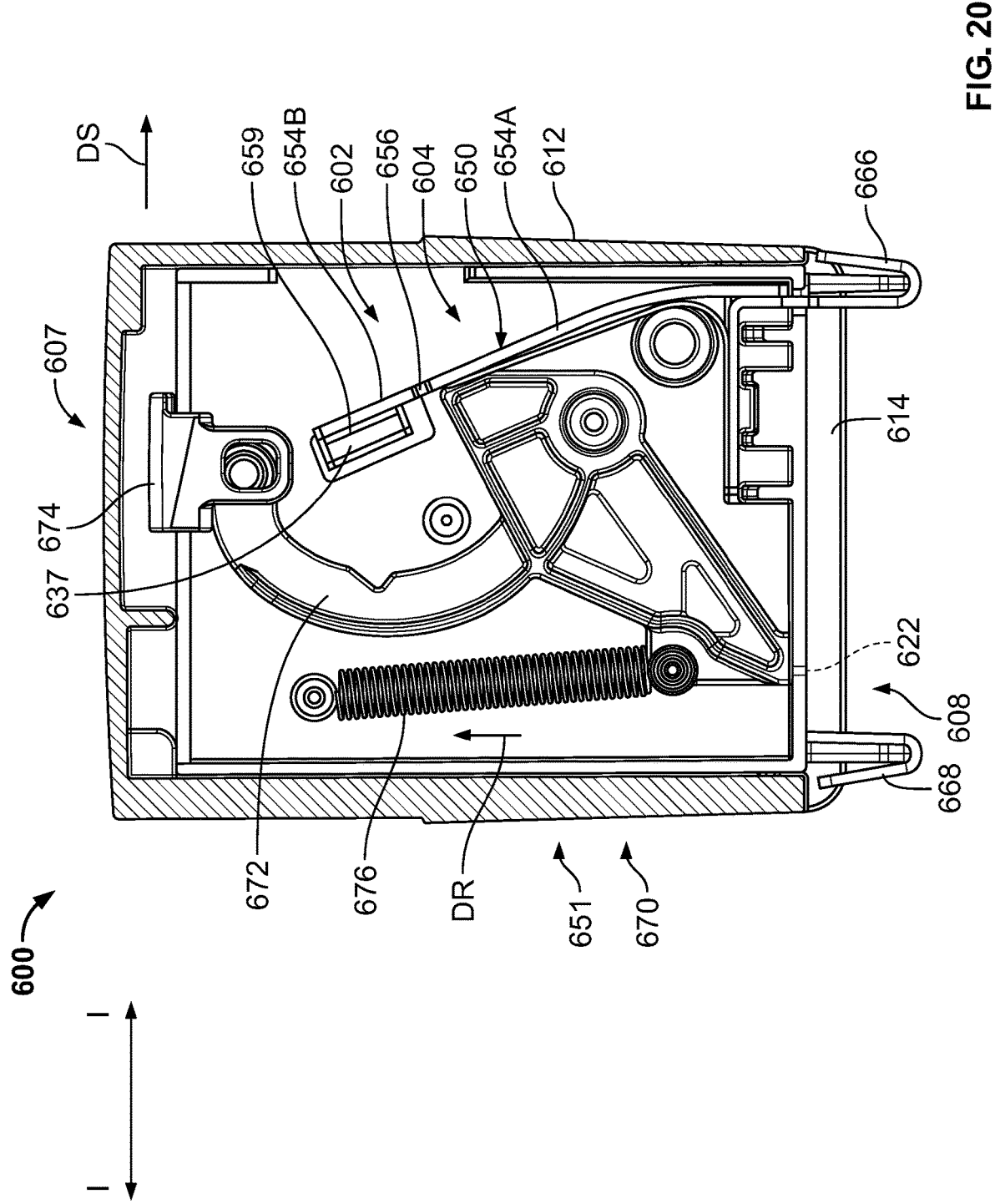
FIG. 20 is a fragmentary view of the SPD of FIG. 16 from an opposing side.
Figure 21:
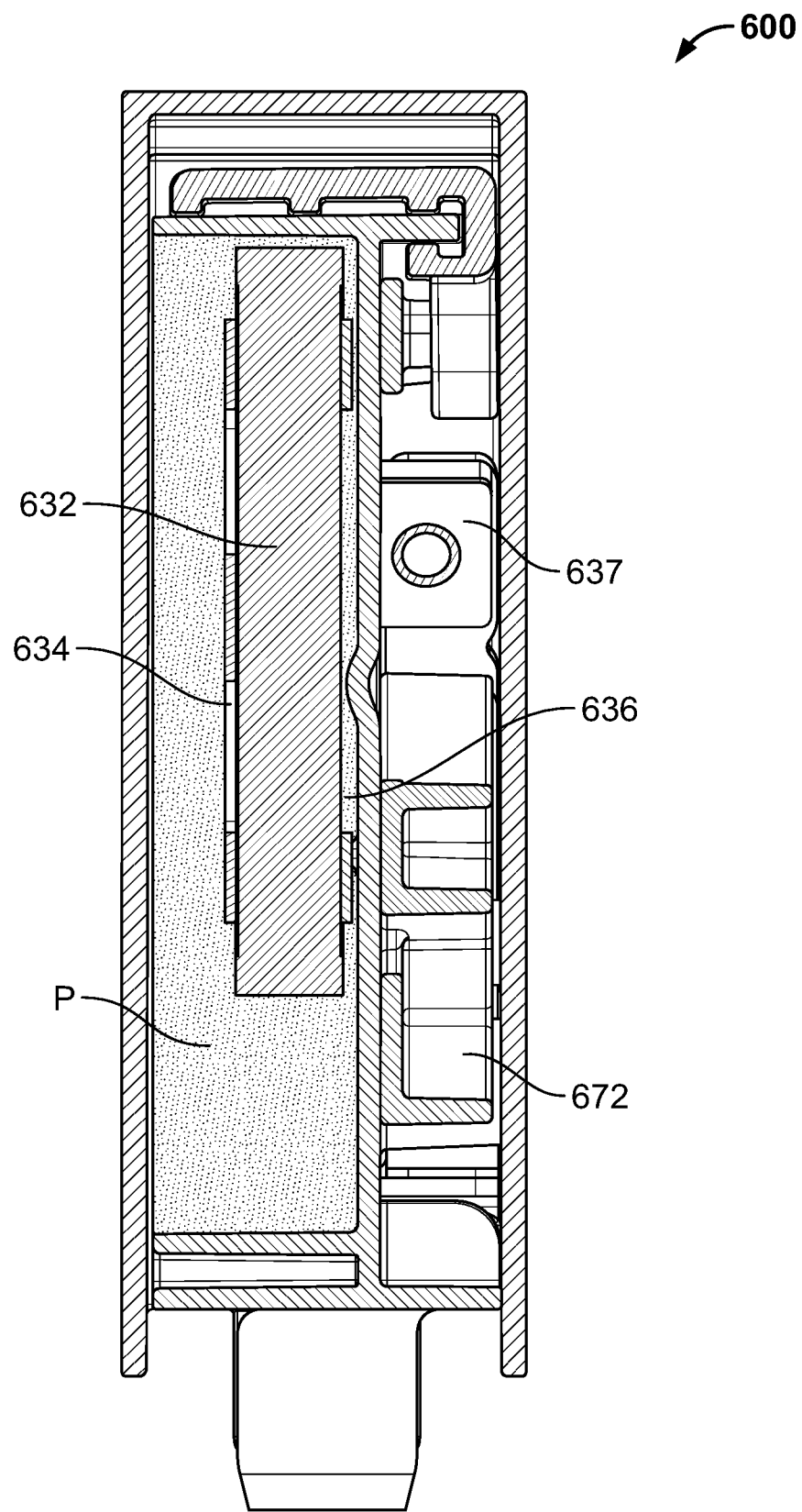
FIG. 21 is a cross-sectional view of the SPD of FIG. 16.

The SPD module 600 (i.e., each of the SPD modules 600-1, 600-2, 600-3) includes a housing 610 (FIG. 16), an overvoltage clamping element subassembly 630 (FIG. 17), an integral thermal disconnector mechanism 651, an integral indicator mechanism 670 (including a local alarm mechanism 607, and a remote alarm mechanism 608; FIG. 20), a first fail-safe mechanism 602, and a second fail-safe mechanism 604 disposed in the housing 610, as discussed in more detail below. The SPD module 600 further includes potting P (shown only in FIG. 21), a first electrical contact member 666, and a second electrical contact member 668.

The housing 610 includes an inner housing member or frame 614 and an outer housing member or cover 612 collectively forming the housing 610. The housing 610 defines an internal chamber or cavity.

A front indicator opening or window 612B (FIG. 9) is provided on a front wall of the cover 612. The indicator window 612B may serve to visually indicate a change in status of the module 100, as discussed below.

A remote pin port 622 is provided in the rear wall of the frame 614.

The housing members 612, 614 may be formed of any suitable material or materials. In some embodiments, each of the housing members 612, 614 is formed of a rigid polymeric material. Suitable polymeric materials may include polyamide (PA), polypropylene (PP), polyphenylene sulfide (PPS), or ABS, for example.

In some embodiments and as shown, the overvoltage clamping element subassembly 630 includes a varistor 632, a first electrode 634 (also referred to herein as the "ground electrode"), and a second electrode 636 (also referred to herein as the "disconnect electrode").

The varistor 632 has opposed contact surfaces 632A, 632B. Metallization layers 633 may cover the contact surfaces 632A, 632B.

The thickness of each of the varistor 632 and the diameters of its contact surfaces 632A, 632B will depend on the varistor characteristics desired for the particular application. In some embodiments, the varistor 632 has a width to thickness ratio of at least 2. In some embodiments, the thickness of the varistor 632 is in the range of from about 0.75 to 15 mm.

The varistor material of the varistor 632 may be any suitable material conventionally used for varistors, namely, a material exhibiting a nonlinear resistance characteristic with applied voltage. In some embodiments, the varistor 632 is a metal oxide varistor (MOV). In some embodiments, the resistance becomes very low when a prescribed voltage is exceeded. The varistor material may be a doped metal oxide or silicon carbide, for example. Suitable metal oxides include zinc oxide compounds.

The first or ground electrode 634 includes a contact portion 634A, and an integral terminal tab 634C. The ground electrode 634 is electrically conductive. In some embodiments, the ground electrode 634 is formed of metal. Suitable metals may include nickel brass or copper alloys such as CuSn 6 or Cu-ETP. In some embodiments, the ground electrode 634 is unitary (composite or monolithic) and, in some embodiments, the ground electrode 634 is monolithic.

The second or disconnect electrode 636 includes a contact portion 636A and a terminal tab 637. The disconnect electrode 636 is electrically conductive. In some embodiments, the disconnect electrode 636 is formed of metal. Suitable metals may include nickel brass or copper alloys such as CuSn 6 or Cu-ETP. In some embodiments, the disconnect electrode 636 is unitary (composite or monolithic) and, in some embodiments, the disconnect electrode 636 is monolithic.

The ground electrode 634 and the disconnect electrode 636 are mounted on the outer surfaces 632A and 632B of the varistor 632. More particularly, the ground electrode 634 may be bonded to the metallization layer 633 of the contact surface 632A by solder and the disconnect electrode 636 is bonded to the metallization layer 633 of the contact surface 632B by solder so that the electrodes 634 and 636 are electrically connected to the contact surfaces 632A and 632B, respectively.

The terminal tab 637 serves as an electrical conductor that extends laterally through the frame 614. A section of the terminal tab 637 projects laterally a prescribed extension distance laterally beyond the surface 632B of the varistor 632.

The contact member 666 may be formed of any suitable material or materials. In some embodiments, the contact member 666 is formed of metal. Suitable metal materials may include nickel brass, CuSn 0.15, CuSN 6, CuP 0.008, for example. In some embodiments, the contact member 666 is unitary and, in some embodiments, is monolithic.

The thermal disconnector mechanism 651 (FIG. 20) includes a disconnect spring 650 and a layer of solder 659.

The disconnect spring 650 includes a cantilevered free leg. The free leg includes a lower portion 654A and an upper contact portion 654B. The contact portion 654B includes an inner contact face facing the terminal tab 637. A weak region 656 is located in the spring 650 between the lower portion 654A and the contact portion 654B. The weak region 656 may include a notch defined in the side edge of the spring 650. As a result, the spring 650 has a reduced cross-sectional area at the weak region 656.

The spring 650 may be formed of any suitable electrically conductive material or materials. In some embodiments, the spring 650 is formed of metal. Suitable metal materials may include CuSn 0.15 alloy (bronze), nickel brass, CuSn6, Cu-ETP, oxygen free copper, for example.

The second electrical contact member 668 (FIG. 7) includes an integral U-shaped module terminal connector 668B. The spring 650 is secured to the contact member 668 (e.g., by rivets). The contact member 668 may be formed of any suitable material or materials. In some embodiments, the contact member 668 is formed of metal. Suitable metal materials may include nickel brass, CuSn 0.15, CuSN 6, CuP 0.008, for example. In some embodiments, the contact member 668 is unitary and, in some embodiments, is monolithic.

According to some embodiments, the solder 659 is selected such that its melting point is greater than a prescribed maximum standard operating temperature, but less than or equal to a prescribed disconnect temperature. The maximum standard operating temperature may be the greatest temperature expected in the solder 659 during normal operation (including handling overvoltage surges within the designed for range of the module 600). The prescribed disconnect temperature is the temperature of the solder 659 at with the solder 659 is intended to release the spring 150 in order to actuate the first fail-safe mechanism 602.

According to some embodiments, the solder 659 has a melting point in the range of from about 109° C. to 160° C. and, in some embodiments, in the range of from about 85° C. to 200° C.

The indicator mechanism 670 (FIG. 20) includes a swing arm 672, an indicator shuttle or member 674, and an indicator spring 676. The indicator member 674 is slidably secured to the rail or front wall of the frame 616 to slide along an indicator axis I-I (FIG. 20).

The indicator spring 676 is elastically stretched so that it exerts a persistent pull force on the swing arm 672.

When the module 600 is assembled in the ready configuration as shown in FIG. 20, the disconnect spring 650 is elastically bent, deformed or deflected so that it persistently exerts a biasing load on the solder 659 pulling away from the terminal tab 637 in a release direction DR.

In the ready configuration, the swing arm 672 is locked in the position shown in FIG. 20 by the disconnect spring 650. The indicator spring 676 is elastically extended or stretched so that it persistently exerts a biasing load pulling the swing arm 672 in a pivot direction DP (i.e., toward the front wall 116B). The indicator member 674 is thereby secured in the ready position wherein the indicator surface of the indicator member 674 is not aligned with and visible through the window 612B.

The SPD assembly 500 may be used as follows in accordance with methods of the present invention.

In the illustrated circuit installation, there are three SPD modules 600-1, 600-2, 600-2 each connected between a respective line L1, L2, L3 and N (i.e., L-N). Each line L1, L2, L3 may be provided with a main circuit breaker or fuse and an external disconnector such as a supplemental fuse between the line and its SPD module 600-1, 600-2, 600-3.

Figure 9:
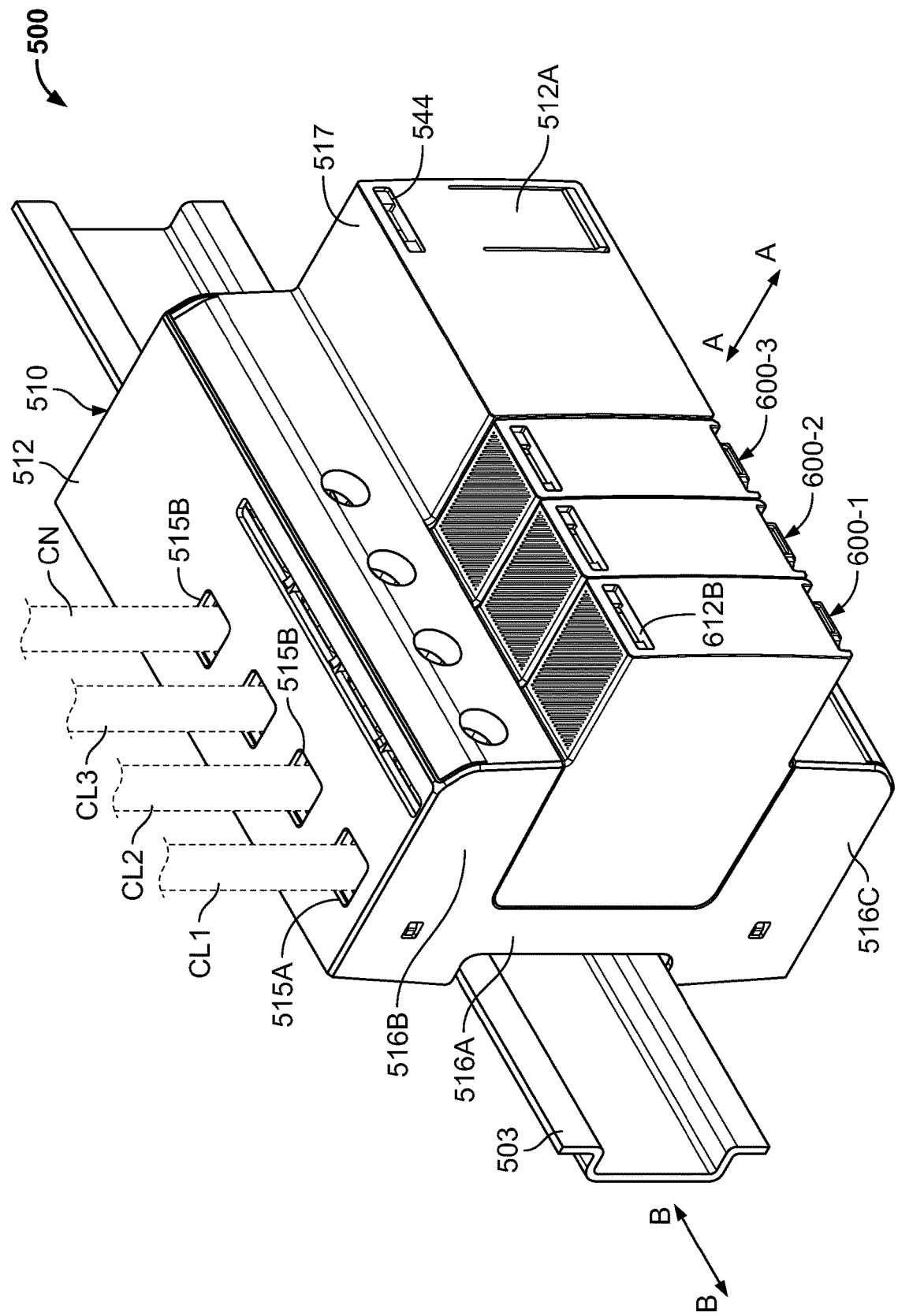
FIG. 9 is a front perspective view of an SPD assembly according to some embodiments.
Figure 10:
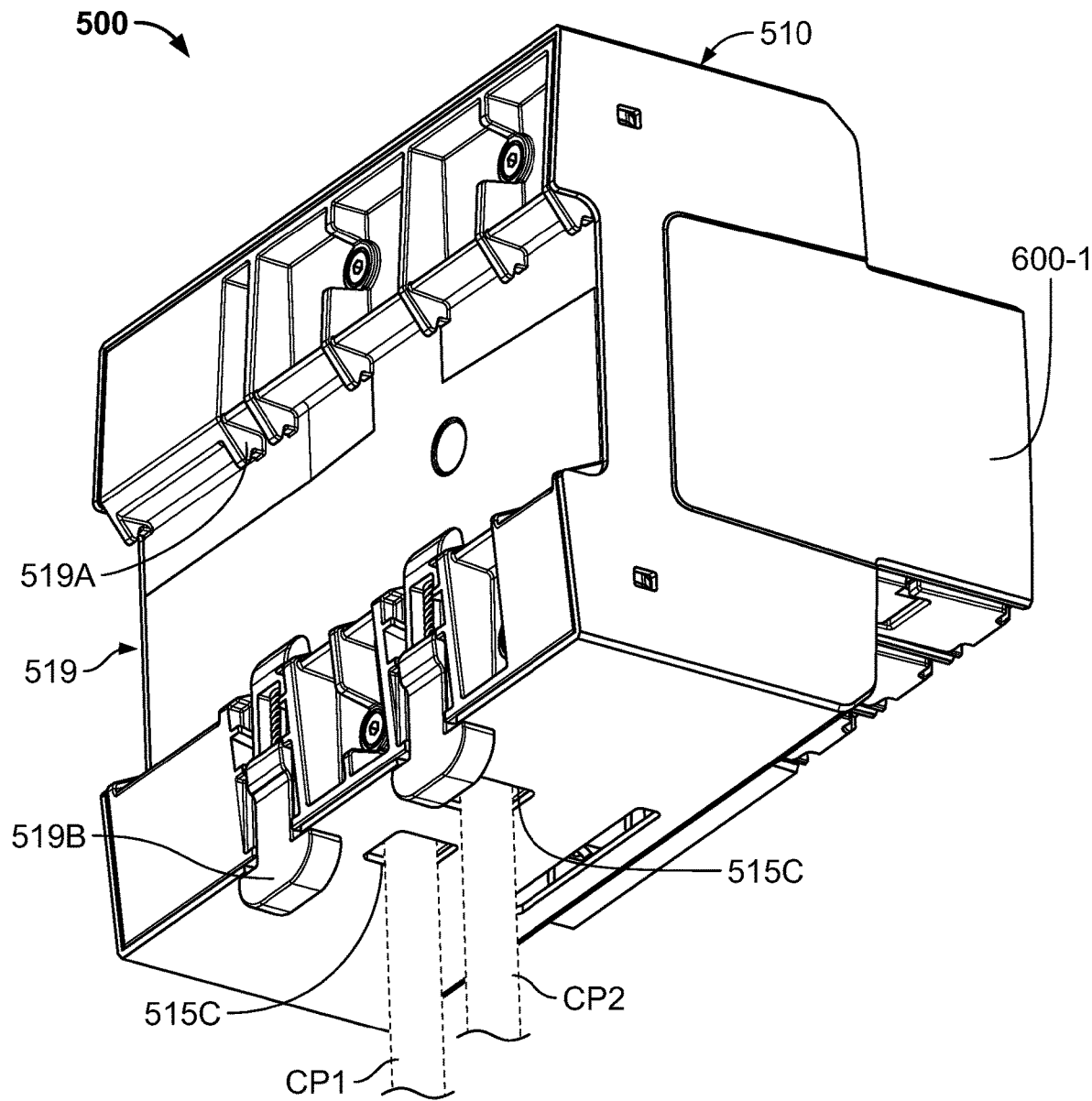
FIG. 10 is a rear perspective view of the SPD assembly of FIG. 9.

In use, the base module 510 is mounted on the DIN rail 503 as shown in FIG. 9.

Cables CL1, CL2, CL3, CN, CP1, CP2 (shown in dashed line in FIGS. 9 and 10) are inserted through the cable ports 515A-C of the base module 510 as shown and secured in the respective clamp connectors 522, 525, 529. The cable CL1 is connected to the line L1, the cable CL2 is connected to the line L2, the cable CL3 is connected to the line L3, the cable CN is connected to the neutral N, and the cables CP1, CP2 are connected to Protective Earth (PE).

Each SPD module 600-1, 600-2, 600-3 is axially plugged or inserted into a respective one of the receiver slots 518 in an insertion direction along the axis A-A through the front opening. The SPD module 600 is pushed back into the receiver slot 518 until the rear end of the module 600 substantially engages the front side of the rear housing section 516A, as shown in FIG. 9.

Insertion of each SPD module 600 causes the terminals 666 and 668 of the SPD module to be inserted into the sockets 522B and 532 of the connector assemblies 522 and 530 in the associated slot 518.

Operation of the SPD assembly 500 and conditions or transient overvoltage events on the line L1 and SPD module 600-1 (hereinafter, referred to as SPD module 600) will be described hereinbelow. However, it will be appreciated that this description likewise applies to the SPD modules 600-2, 600-3 and the lines L2, L3.

Because the thermal disconnector mechanism 651 is in its ready position, the indicator member 674 is held in a retracted position (FIG. 20). Additionally, when the module 600 is inserted into its receiver slot 518, the remote control pin 548 of the switch 547 associated with the receiving slot 518 is thereby depressed by the end of the swing arm 672 that covers the port 622. The depressed state of the switch 548 is detected by the electrical circuit assembly 540. The base module 510 thereby provides feedback through the switch 547 that the module 600 has been seated in the selected one of the slots 518 of the base module 510 and the SPD module 600 is in its ready or operational (non-failed) condition. The switches 547 thereby serve as SPD module presence sensors. The switches 547 may provide an interface for connections between the control module 115 and components, such as the varistors 120-1, 120-2, and 120-3, the leakage current sensor 142, the surge current sensor 144, and/or the varistor/GDT failure contacts 155.

The SPD module 600 can be released and removed from the module 510 by executing a reverse of the foregoing procedure. The foregoing steps of mounting and removing the SPD module 600 or other suitably configured modules in and from module 510 can be repeated multiple times. For example, in the event that the varistor 632 of the SPD module 600 is degraded or destroyed or no longer of proper specification for the intended application, the SPD module 600 can be replaced with a fresh or suitably constructed module. Removal of an SPD module 600 will similarly release the remote control pin 548 of the switch 547 associated with the receiving slot 518, from which the electrical circuit assembly 540 detects and determines that a functional SPD module 600 is no longer present in the corresponding slot 518.

The SPD module 600 has several modes of operation depending on the state of the varistor 632 and external event conditions.

In some modes, the first fail-safe mechanism 602 operates by heating the solder 659 until the solder melts and permits the elastic spring loads of the spring 650 to cause the contact portion 654B to pull away from the terminal tab 637 and thereby out of electrical continuity with the electrode 636. The varistor 632 is thereby electrically disconnected from the contact member 668, creating an open circuit between the terminals 666, 668.

In some modes, the second fail-safe mechanism 604 operates by heating the spring 650 at the weak region 656 until the weak region is sufficiently heat-softened to permit the loads of the spring 650 to cause the spring 650 to break at the weak region 656. The contact portion 654B may remain bonded to the terminal tab 637 by the solder 659, but the lower portion 654A pulls away from contact portion 654B and thereby out of electrical continuity with the electrode 636. The varistor 632 is thereby electrically disconnected from the contact member 668, creating an open circuit between the terminals 666, 668.

During normal operation (referred to herein as Mode 1), the SPD module 600 operates as an open circuit between the line cable CL1 and the PE cables CP1, CP2. The thermal disconnector mechanism 651 remains in a ready position (FIG. 20), with the contact portion 654B of the disconnect spring 650 bonded to and in electrical continuity with the terminal tab 637 by the solder 659. In this normal mode, the varistor 632 is an insulator up to the nominal clamping voltage VNOM (and therefore the SPD module 600 is an insulator as well). In this mode, the fail-safe mechanisms 602, 604 are not actuated (i.e., the thermal disconnector 651 remains in the ready position (FIG. 20)).

In the event of a transient overvoltage or surge current in, the line L1, protection of power system load devices may necessitate providing a current path to ground for the excess current of the surge current. The surge current may generate a transient overvoltage between the line cable CL1 and the PE cables CP1, CP2, which may overcome the isolation of the varistor 632 and one or both of the GDT 570. In this event and mode (referred to herein as Mode 2), the varistor 632 is subjected to an overvoltage exceeding VNOM, and temporarily and reversibly becomes a low resistance electrical conductor. Similarly, the GDT 570 is subjected to a transient overvoltage exceeding its break down voltage, and temporarily and reversibly becomes a low resistance electrical conductor. The GDT 570 and varistor 132 will then divert, shunt or allow the high surge current or impulse current to flow from the line cable CL1, through the line connector 522, through the contact member 668, through the spring 650, through the solder 659, through the terminal tab 637, through the electrode 636, through the varistor 632, through the electrode 634, through the contact member 666, through the neutral busbar 530, through the GDT 570, through the PE connector 528, and to the protective earth cables CP1, CP2 for a short duration.

In Mode 2, the fail-safe mechanism 602 does not operate because the overvoltage event is short in duration and the heat generated by the surge current is insufficient to melt the solder 659.

In Mode 2, the fail-safe mechanism 604 does not operate because the heat generated in the spring 650 is not sufficient to weaken the weak region 656 to the point of breaking.

If the surge or impulse current is below the maximum surge/impulse current that the SPD module 600 is rated for, the external fuse will not blow and the varistor 632 should remain functional. In this case, because the fail-safe mechanisms 602, 604 are not tripped, the SPD module 600 can remain in place for future overvoltage events.

If the surge or impulse current exceeds the maximum surge/impulse current that the SPD module 600 is rated for, the external fuse will typically blow or be tripped. The varistor 632 may also fail internally as a short (with pinhole) or with limited resistance. In such cases, the mode of operations will be a failure mode as described below for Modes 3, 4 or 5.

In a third mode (Mode 3), the varistor 632 is in end of life mode with a low leakage current between the lines L1 and PE. The varistor 632 fails as a linear resistance. This type of varistor failure could be the result of multiple surge/impulse currents. The leakage current generates heat in the varistor 632 from ohmic losses. In some cases, the leakage current occurs during normal operation and is low (e.g., from about 0 to 0.5 A). The heat generated in the varistor 632 progressively deteriorates the varistor 632 and builds up over an extended duration.

In Mode 3, the fail-safe mechanism 602 operates. More particularly, the heat (e.g., from ohmic losses in the varistor 132) is transferred from the varistor 632 to the electrode 636, and then to the solder 659. Over an extended time period (e.g., in the range of from about 60 seconds to 48 hours), the heat builds up in the solder 659 until the solder 659 melts. The melted solder 659 releases the spring 650 into an open or released configuration to open the circuit in the SPD module 600. The varistor 632 is thereby prevented from catastrophically overheating.

In Mode 3, the fail-safe mechanism 604 does not operate because the heat generated in the spring 650 is not sufficient to weaken the weak region 656 to the point of breaking.

In Mode 3, the SPD module 600 must be replaced because the fail-safe mechanism 602 has been tripped.

In a fourth mode (Mode 4), the varistor 632 is in good condition (i.e., not in end of life condition), but there is a Temporary Overvoltage (TOV) event wherein the voltage across the terminals 666, 668 forces the varistor 632 to conduct an increased surge current (typically, in the range of from about 0 to 10 A). This current builds up heat over a duration (e.g., in the range of from about 5 seconds to 120 minutes) that is shorter than the duration of the surge current that triggers the fail-safe mechanism 602 in Mode 3, but far longer than the impulse current that is conducted by the varistor 632 in Mode 2.

In Mode 4, the fail-safe mechanism 602 is tripped (i.e., the spring 650 is released by the solder 659) to open the circuit through the SPD module 600 in the same manner as described for Mode 3.

In Mode 4, the fail-safe mechanism 604 does not operate because the heat generated in the spring 650 is not sufficient to weaken the weak region 656 to the point of breaking.

In Mode 4, the SPD module 600 must be replaced because the fail-safe mechanism 602 has been tripped.

In a fifth mode (Mode 5), the varistor 632 is in end of life mode as a short circuit or a linear resistance that allows current from the power source to be conducted therethrough. The value of the conducted current could be between about 10 Amps and the maximum short circuit current of the power source (which should be lower than the short circuit current rating of the SPD module 600). This depends on the specific configuration of the electrical installation and the severity of the varistor failure.

For Mode 5, there are two mechanisms operating to protect the SPD module 600: namely, the external fuse and the fail-safe mechanism 604 as described above. The fail-safe mechanism 604 is triggered for current levels between a threshold (e.g., 10 Amps) and intermediate current levels (typically five times the rating of the external fuse). For higher current levels, the external fuse will trip first to protect the SPD module 600. For example, an SPD module 600 could be protected by the fail-safe mechanism 604 for current levels up to 1000 A and with a 200 A external fuse for current levels up to 25 kA.

In Mode 5, for intermediate currents, the current level is not high enough to trip the external fuse within a reasonable amount of time (e.g., in the range of from about 50 ms to 5000 ms). Further, the fail-safe mechanism 602 is too slow and cannot protect the SPD module 600. By the time the fail-safe mechanism 602 trips, there would be significant internal damage to the SPD module 600.

Therefore, in Mode 5, the fail-safe mechanism 604 is tripped to open the circuit through the SPD module 600. More particularly, the current heats the spring 650 at the weak region 656 until the loads of the spring 650 cause the spring 650 to break at the weak region 656 and produce the necessary distance between the electrodes for extinguishing the associated arc. The varistor 632 is thereby electrically disconnected from the contact member 668, creating an open circuit between the terminals 666, 668. Only the fail-safe mechanism 604 operates in time and disconnects the SPD module 600 before any internal damage takes place.

Alternatively, a lower rated external fuse could be used so that the external fuse will trip much faster and protect the SPD module 600 even at intermediate current levels. For example, a 10 A external fuse could be used and the fail-safe mechanism 604 could be omitted. But then, such a lower rated external fuse would trip at surge/impulse currents below the level that the SPD module 600 could actually withstand. Therefore, by using the fail-safe mechanism 604, the performance of the SPD module 600 is extended in surge/impulse currents.

The release of the disconnect spring 650 as described above (by actuation of the fail-safe mechanism 602 or the fail-safe mechanism 604) also actuates a local alert mechanism 607. The displacement of the spring 650 in the release direction DR frees the swing arm 172 from the spring 650. The swing arm 672 is driven in a pivot direction by the spring 676 from the locked position (FIG. 20) to an indicating position. The indicator member 674 is thereby driven by the spring 676 to slide along the front wall in a signaling direction DS (FIG. 20). The indicator member 674 is thereby displaced to an alert position as shown in wherein an indicator surface of the indicator member is aligned with and visible through the front window 612B. The indicator surface has a noticeably different visual appearance through the front window 612B than the housing indicator surface, providing a visual alert or indication so that an operator can readily determine that the local alert mechanism 607 has been activated. For example, the housing indicator surface and the indicator member surface may have distinctly different colors (e.g., green versus red). In this manner, the local alert mechanism 607 can provide a convenient indication that the SPD module 600 has assumed its open circuit configuration or state.

The release of the swing arm 672 as described above also actuates a remote alert mechanism 608. In the ready position of the SPD module 600, an end of the swing arm 672 covers the rear port 622 of the frame so that the switch pin 548 of the base module 510 is maintained compressed. The swing arm 672 pivots away from the rear opening so that the switch pin 548 is thereby permitted to extend further into the module 600 to an alert signal position. The switch 547 detects the displacement of the pin 548 and provides an electrical signal to the control module 115 (FIG. 3). In this manner, the remote alert mechanism 608 can serve as a thermal disconnect sensor and provides a convenient remote indication that the SPD module 600 has assumed its open circuit configuration or state.

As discussed above, the thermal disconnector mechanism 651 is responsive to temperature rise in the SPD module 600 when current flows through the varistor 632, and disconnects the varistor 632 from the power line. In general, the thermal disconnector mechanism 651 may be configured to desirably balance the response of the SPD assembly 600 and the external fuse to impulse or surge currents versus leakage currents. The failure mode of the varistor 632 could be one of the modes discussed above, for example: progressive deterioration of the varistor 632 that will result in increased leakage current at normal operation (e.g., 0-0.5 A); temporary overvoltage (TOV) events that will result in an increased conduction of leakage current (e.g., 0.5 A-10 A); or a short circuit of the varistor 632 that may result in a significant current conduction (a few amps up to the full prospective short circuit current of the power line, e.g., up to 200 kArms).

When the varistor 632 has an extended leakage or surge current conduction (Modes 3 and 4 discussed above), then the varistor 632 will progressively overheat over an extended period of time. Eventually, the thermal disconnector mechanism 651 will then react to the temperature rise of the varistor 632 that is transferred to the solder joint through the electrode tab 637. How fast the thermal disconnector mechanism 651 will react to this event on a given temperature profile of the varistor 632 depends on the materials of the components of the thermal disconnector mechanism 651 and the melting point of the solder 659. These parameters can be selected to tune the response of the thermal disconnector mechanism 651 to different event profiles or types of events.

Further, the reaction time of the thermal disconnector mechanism 651 should not be too fast, because in cases where the varistor 632 conducts surge currents of increased energy, the varistor 632 will overheat and the disconnector mechanism 651 might trip, even though the varistor 632 is intact. Therefore, it is desirable or necessary to fine tune the reaction time of the thermal disconnector mechanism 651. Therefore, the selection of the material and shape of the elements that constitute the thermal disconnector mechanism 651 are important, and may be critical, for proper operation during all kinds of events/exposures the SPD module 600 might face, as the reaction time depends on this selection.

During sudden failure of the varistor 632 to a short circuit, the current through the varistor 632 could reach from intermediate values (a few kA) up to the maximum short circuit current of the power line. For intermediate values of current, typically the weak point 656 of the thermal disconnector will overheat first, melt and disconnect the current via the second fail-safe mechanism 604. This is done because the weak point 656 of the thermal disconnector mechanism 651 has a decreased cross section area of higher resistance. Also the selection of the material of the weak region 656 is important for its fast reaction time, as in such events the second fail-safe mechanism 604 of the thermal disconnector mechanism 651 must react very fast. The second fail-safe mechanism 604 is not responsive to surge currents, so there is no low limit for its response time. In addition, if the second fail-safe mechanism 604 does not react fast enough, the SPD module 600 may be damaged due to the high current conducted. Further, during these events there will be no melting of the solder 659, as the first fail-safe mechanism 602 takes a relatively long time to react (seconds), while the second fail-safe mechanism 604 executes more quickly and the weak point 656 will melt in milliseconds (ms).

When the short circuit current is high enough, then the SPD module 600 is protected by an external fuse. In general, the external fuse will trip when the short circuit current is sufficient to trip when the external fuse. The thermal disconnector mechanism 651 (either the first fail-safe mechanism 602 or the second fail-safe mechanism 604) will trip when the short circuit current is insufficient to trip the fuse.

In addition to the operations and responses of the SPD modules 600 described above, the base module 510 and the electrical circuit assembly 540 thereof provide the functionality, operations, responses and interoperability described above (e.g., with reference to FIGS. 1-8).

In the event a leakage current is conducted through one or more of the SPD modules 600, the leakage CT sensor 550 provides a corresponding proportional current to the electrical circuit assembly 540 that enables the electrical circuit assembly 540 to detect (and report) the occurrence of the leakage current. More particularly, the busbar sensing section 536 serves as a primary winding and the AC leakage current conducted through the CT sensor passage 554 (via the busbar sensing section 536) induces a magnetic field in the core 555, which in turn induces a secondary alternating current in the secondary winding 556 of the leakage CT sensor 550. The secondary alternating current is directed to the electrical circuit assembly 540, which may include a suitable current measuring circuit. The operation of CT sensors and processing of the secondary alternating currents are well-known to those of skill in the art, and therefore will not be discussed in detail herein.

In the event a surge current is conducted through one or more of the SPD modules 600 or the neutral connector 524, the surge CT sensor 560 provides a corresponding proportional current to the electrical circuit assembly 540 that enables the electrical circuit assembly 540 to detect (and report) the occurrence of the surge current (i.e., a surge event). More particularly, the GDT 570 serves as a primary winding and the AC leakage current conducted through the CT sensor passage 564 (via the spark gap 577 between the anode 574 and the cathode 576) induces a magnetic field in the core 565, which in turn induces a secondary alternating current in the secondary winding 566 of the surge CT sensor 560. The secondary alternating current is directed to the electrical circuit assembly 540, which may include a suitable current measuring circuit. The operation of CT sensors and processing of the secondary alternating currents are well-known to those of skill in the art, and therefore will not be discussed in detail herein.

The base module 510 may be further provided with voltage designator sockets and the SPD modules 600-2, 600-2, 600-3 may be provided with voltage designator pins (not shown) as disclosed in U.S. Pat. No. 10,340,110 to Vrhune et al. (the disclosure of which is incorporated herein by reference in its entirety). These components and features may be used as described in U.S. Pat. No. 10,340,110.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A surge protective device (SPD), comprising:
an overvoltage protection circuit; and
a control module coupled to the overvoltage protection circuit that is configured to monitor at least one performance characteristic of the overvoltage protection circuit and is further configured to communicate the at least one performance characteristic to a destination external to the surge protective device;
wherein the at least one performance characteristic of the overvoltage protection circuit comprises an impedance of a galvanic loop formed between one power line of a three-phase power line configuration originating at an electrical power transformer site and a neutral line or a protective earth terminal, the galvanic loop including the control module therein.

2. The SPD of claim 1, wherein the control module is further configured to communicate the at least one performance characteristic to the destination using a wireless communication protocol.

3. The SPD of claim 2, wherein the wireless communication protocol comprises a cellular communication protocol, a Wi-Fi communication protocol, a Bluetooth communication protocol, and/or a Near Field Communication (NFC) communication protocol.

4. The SPD of claim 1, wherein the control module is further configured to communicate the at least one performance characteristic to the destination over a wired connection.

5. The SPD of claim 1, wherein the at least one performance characteristic of the overvoltage protection circuit comprises information corresponding to a transient overvoltage event.

6. The SPD of claim 5, wherein the information corresponding to a transient overvoltage event comprises information corresponding to a plurality of transient overvoltage events.

7. The SPD of claim 6, wherein the information corresponding to the plurality of transient overvoltage events comprises:
a plurality of timestamps corresponding to the plurality of transient overvoltage events, respectively; and
a count of a number of the plurality of overvoltage events.

8. The SPD of claim 1, wherein the overvoltage protection circuit comprises:
a varistor; and
a gas discharge tube connected to the at least one varistor.

9. The SPD of claim 8, wherein the at least one performance characteristic of the overvoltage protection circuit comprises a leakage current of the varistor.

10. The SPD of claim 9, wherein the control module is further configured to generate a replacement alarm for the varistor based on the leakage current.

11. The SPD of claim 8, wherein the overvoltage protection circuit comprises a plurality of varistors; and
wherein the at least one performance characteristic of the overvoltage protection circuit comprises a plurality of leakage currents corresponding to the plurality of varistors, respectively.

12. The SPD of claim 8, wherein the at least one performance characteristic of the overvoltage protection circuit comprises information corresponding to a surge current event through the gas discharge tube.

13. The SPD of claim 12, wherein the information corresponding to the surge current event comprises information corresponding to a plurality of surge current events.

14. The SPD of claim 13, wherein the information corresponding to the plurality of surge current events comprises:
a plurality of timestamps corresponding to the plurality of surge current events, respectively; and
a count of a number of the plurality of surge current events.

15. The SPD of claim 8, wherein the control module is further configured to generate a failure alarm responsive to detecting a failure of the varistor or the gas discharge tube.

16. The SPD of claim 1, wherein the at least one performance characteristic of the overvoltage protection circuit comprises the impedance of the galvanic loop formed between one power line of the three-phase power line configuration originating at the electrical power transformer site and the neutral line, the galvanic loop including the control module therein.

17. The SPD of claim 1, wherein the at least one performance characteristic of the overvoltage protection circuit comprises the impedance of the galvanic loop formed between one power line of the three-phase power line configuration originating at the electrical power transformer site and the protective earth terminal, the galvanic loop including the control module therein.

18. The SPD of claim 1, further comprising:
a housing;
wherein the overvoltage protection circuit and the control module are coupled to the housing.

19. The SPD of claim 1, wherein the SPD is a first SPD and the destination is a second SPD; and wherein the control module is further configured to communicate an operational status of the SPD to the second SPD.

20. An SPD management system, comprising:
a processor; and
a memory coupled to the processor and comprising computer readable program code embodied in the memory that is executable by the processor to perform operations comprising:
establishing a communication connection with an SPD, the SPD comprising an overvoltage protection circuit and a control module;
associating a geolocation with the SPD; and
receiving information corresponding to at least one performance characteristic for the overvoltage protection circuit from the control module.

21. The SPD management system of claim 20, wherein receiving the information comprises:
receiving the information corresponding to the at least one performance characteristic for the overvoltage protection circuit from the control module using a wireless communication protocol.

22. The SPD management system of claim 21, wherein the wireless communication protocol comprises a cellular communication protocol, a Wi-Fi communication protocol, a Bluetooth communication protocol, and/or a Near Field Communication (NFC) communication protocol.

23. The SPD management system of claim 20, wherein receiving the information comprises:
receiving the information corresponding to the at least one performance characteristic for the overvoltage protection circuit from the control module over a wired connection.

24. A surge protective device (SPD) comprising:
a gas discharge tube (GDT) including an anode and a cathode; and
a current transformer (CT) sensor;
wherein at least a portion of the CT sensor surrounds the GDT at as location between the anode and the cathode.

25. The SPD of claim 24, wherein the GDT comprises a first section and a second section, the CT sensor being mounted on the second section;
wherein a first diameter of the first section is greater than a second diameter of the second section.

26. A surge protective device (SPD), comprising:
an overvoltage protection circuit; and
a control module coupled to the overvoltage protection circuit that is configured to monitor at least one performance characteristic of the overvoltage protection circuit and is further configured to analyze the at least one performance characteristic to generate an analyzed output and to communicate the analyzed output to a destination external to the surge protective device;
wherein the SPD is a first SPD and the destination is a second SPD; and
wherein the control module is further configured to communicate the analyzed output to the second SPD.

* * * * *

UNITED STATES PATENT AND TRADEMARK OFFICE
CERTIFICATE OF CORRECTION

PATENT NO. : 11,990,745 B2
APPLICATION NO. : 17/573743
DATED : May 21, 2024
INVENTOR(S) : Polychronakis et al.

Page 1 of 1

It is certified that error appears in the above-identified patent and that said Letters Patent is hereby corrected as shown below:

On the Title Page

(56) References Cited, U.S. PATENT DOCUMENTS, Page 2, Column 2, Line 1: Please correct "Agnoux" to read --Lagnoux--

(56) References Cited, FOREIGN PATENT DOCUMENTS, Page 3, Column 1, Line 9: Please correct "EP 60-187002 A 9/1985" to read --JP 60-187002 A 9/1985--

In the Specification

Column 19, Line 18: Please correct "522. 525, 529." to read --522, 525, 529.--

In the Claims

Column 30, Line 10, Claim 24: Please correct "at as location" to read --at a location--

Signed and Sealed this
Twentieth Day of August, 2024

Katherine Kelly Vidal
*Director of the United States Patent and Trademark Office*